US011673657B2

(12) United States Patent
Duffy et al.

(10) Patent No.: US 11,673,657 B2
(45) Date of Patent: Jun. 13, 2023

(54) MULTI-ROTOR ROTORCRAFT

(71) Applicant: The Boeing Company, Chicago, IL (US)

(72) Inventors: Michael J. Duffy, Lansdale, PA (US); Joshua B. Jarvis, St. Charles, MO (US); Roger W. Lacy, West Chester, PA (US); David M. Neely, Kirkwood, MO (US); Eric J. Schulze, Hockessin, DE (US)

(73) Assignee: The Boeing Company, Arlington, VA (US)

(*) Notice: Subject to any disclaimer, the term of this patent is extended or adjusted under 35 U.S.C. 154(b) by 1029 days.

(21) Appl. No.: 16/428,668

(22) Filed: May 31, 2019

(65) Prior Publication Data

US 2020/0346746 A1    Nov. 5, 2020

Related U.S. Application Data

(60) Provisional application No. 62/843,231, filed on May 3, 2019.

(51) Int. Cl.
*B64C 27/20* (2023.01)
*B64C 27/08* (2023.01)
(Continued)

(52) U.S. Cl.
CPC .............. *B64C 27/20* (2013.01); *B64C 27/08* (2013.01); *B64C 29/0025* (2013.01);
(Continued)

(58) Field of Classification Search
CPC ..... B64C 27/20; B64C 27/08; B64C 29/0025; B64C 2201/024; B64C 2201/108;
(Continued)

(56) References Cited

U.S. PATENT DOCUMENTS 3,082,977 A * 3/1963 Melvin ............... B64C 29/0025
244/92
6,105,901 A * 8/2000 Ulanoski ............... F01D 17/162
60/228
(Continued)

FOREIGN PATENT DOCUMENTS

CA         2917434        7/2017
CN       106956771        7/2017
(Continued)

OTHER PUBLICATIONS

European Patent Office, Partial European Search Report for related European U.S. Appl. No. 20/172,614, dated Oct. 2, 2020.
(Continued)

*Primary Examiner* — Medhat Badawi
(74) *Attorney, Agent, or Firm* — Kolitch Romano Dascenzo Gates LLC

(57) ABSTRACT

Multi-rotor rotorcraft comprise a fuselage, and at least four rotor assemblies operatively supported by and spaced-around the fuselage. Each of the at least four rotor assemblies defines a spin volume and a spin diameter. Some multi-rotor rotorcraft further comprise at least one rotor guard that is fixed relative to the fuselage, that borders the spin volume of at least one of the at least four rotor assemblies, and that is configured to provide a visual indication of the spin volume of the at least one of the at least four rotor assemblies. Various configurations of rotor guards are disclosed.

21 Claims, 20 Drawing Sheets

(51) Int. Cl.
  *B64C 29/00* (2006.01)
  *B64U 10/10* (2023.01)
  *B64U 30/20* (2023.01)
  *B64U 50/14* (2023.01)

(52) U.S. Cl.
  CPC .............. *B64U 10/10* (2023.01); *B64U 30/20* (2023.01); *B64U 50/14* (2023.01)

(58) Field of Classification Search
  CPC ............ B64C 2201/162; B64C 1/1415; B64C 1/1423; B64C 15/02; B64C 27/26; B64C 11/001; B64C 2201/027; B64C 2201/128; B64C 27/10; B64C 39/024; B64C 27/006; B64C 1/22; B64D 45/0005; B64U 10/10; B64U 30/20; B64U 50/14; B64U 10/16; B64U 30/299; B64U 2101/61
  See application file for complete search history.

(56) References Cited

U.S. PATENT DOCUMENTS

| | | | |
|---|---|---|---|
| 6,254,032 B1* | 7/2001 | Bucher | B64C 29/0033 244/12.4 |
| 6,520,449 B2* | 2/2003 | Illingworth | F15D 1/00 244/199.1 |
| 6,568,630 B2* | 5/2003 | Yoeli | B64C 11/001 244/12.3 |
| 7,857,253 B2* | 12/2010 | Yoeli | B64C 1/22 244/12.3 |
| 8,322,648 B2* | 12/2012 | Kroetsch | B64C 39/024 244/17.23 |
| 8,794,566 B2* | 8/2014 | Hutson | F16M 13/02 244/50 |
| 8,833,692 B2* | 9/2014 | Yoeli | B64C 29/0025 244/23 A |
| 8,876,038 B2* | 11/2014 | Yoeli | B64C 27/20 244/23 A |
| 8,950,698 B1 | 2/2015 | Rossi | |
| 8,954,206 B2 | 2/2015 | Criado | |
| 8,973,861 B2* | 3/2015 | Zhou | A63H 27/12 446/37 |
| 9,004,973 B2* | 4/2015 | Condon | A63H 13/00 446/37 |
| 9,156,549 B2* | 10/2015 | Vetters | B64C 29/0025 |
| 9,221,539 B2* | 12/2015 | Christensen | B64C 27/32 |
| 9,457,899 B2* | 10/2016 | Duffy | B64C 37/02 |
| 9,475,575 B2 | 10/2016 | Rossi | |
| 9,663,237 B2* | 5/2017 | Senkel | B64C 27/473 |
| 9,688,400 B2* | 6/2017 | Hutson | B60F 5/02 |
| 9,862,487 B2* | 1/2018 | Werner | B64C 39/024 |
| 9,889,930 B2* | 2/2018 | Welsh | B64C 39/024 |
| 10,017,237 B2* | 7/2018 | Hutson | B64C 39/02 |
| 10,035,581 B2* | 7/2018 | Wood | B64C 39/024 |
| D825,380 S* | 8/2018 | Tompkin | D12/16.1 |
| D843,890 S* | 3/2019 | Yang | D12/16.1 |
| D851,540 S* | 6/2019 | Tompkin | D12/16.1 |
| D852,091 S* | 6/2019 | Tompkin | D21/436 |
| D858,352 S* | 9/2019 | Gan | D12/16.1 |
| 10,479,490 B2* | 11/2019 | Bevirt | B64D 47/08 |
| 10,526,079 B1 | 1/2020 | Reichert | B64C 29/0025 |
| 10,549,850 B1* | 2/2020 | Ryan | B64C 27/08 |
| 10,766,615 B1* | 9/2020 | Quarrie | B64C 29/0025 |
| 10,946,958 B2* | 3/2021 | Baek | B64C 27/20 |
| 10,974,823 B2* | 4/2021 | Van Niekerk | B64C 39/024 |
| 10,988,248 B2* | 4/2021 | Mikić | B64C 29/0033 |
| 11,052,998 B2* | 7/2021 | Mores | B64D 27/24 |
| 11,141,673 B1* | 10/2021 | Wood | A63H 30/04 |
| 11,142,308 B2* | 10/2021 | Bucheru | B60V 3/08 |
| 2003/0062442 A1* | 4/2003 | Milde, Jr. | B64C 29/0025 244/12.3 |
| 2003/0062443 A1* | 4/2003 | Wagner | B64C 29/0025 244/12.3 |
| 2003/0085319 A1* | 5/2003 | Wagner | B64C 27/20 244/12.3 |
| 2005/0236517 A1* | 10/2005 | Akaro | B64C 27/08 244/17.23 |
| 2006/0226281 A1* | 10/2006 | Walton | B64C 27/20 244/17.23 |
| 2009/0283629 A1* | 11/2009 | Kroetsch | A63H 27/12 244/17.23 |
| 2011/0042509 A1* | 2/2011 | Bevirt | B64C 29/0033 244/12.4 |
| 2011/0042510 A1* | 2/2011 | Bevirt | B64C 29/0033 244/12.4 |
| 2012/0119016 A1* | 5/2012 | Shaw | B64C 27/20 244/12.3 |
| 2013/0175390 A1 | 7/2013 | Woodworth et al. | |
| 2014/0061366 A1* | 3/2014 | Fink | B64C 39/04 244/6 |
| 2014/0062754 A1* | 3/2014 | Mohamadi | B64D 47/08 89/1.13 |
| 2014/0099853 A1* | 4/2014 | Condon | A63F 13/837 446/37 |
| 2014/0374532 A1* | 12/2014 | Duffy | B64C 37/02 244/2 |
| 2015/0110388 A1 | 7/2015 | Criado et al. | |
| 2015/0274289 A1* | 10/2015 | Newman | B64C 29/0025 244/12.4 |
| 2015/0321759 A1* | 11/2015 | Caubel | B64C 39/024 244/17.23 |
| 2016/0023755 A1* | 1/2016 | Elshafei | B64C 29/0033 244/17.23 |
| 2016/0144953 A1* | 5/2016 | Werner | B64C 39/024 244/17.23 |
| 2016/0214728 A1* | 7/2016 | Rossi | B64C 27/08 |
| 2017/0029101 A1* | 2/2017 | Weissenberg | B64C 27/006 |
| 2017/0043869 A1* | 2/2017 | Howard | B64C 27/20 |
| 2017/0158320 A1* | 6/2017 | Bosch | B64C 39/024 |
| 2017/0197703 A1* | 7/2017 | Wood | B64C 39/024 |
| 2017/0341776 A1* | 11/2017 | McClure | G01C 21/20 |
| 2019/0206266 A1* | 7/2019 | Taveira | G08G 5/0069 |
| 2019/0225327 A1* | 7/2019 | Kidakarn | B64C 27/006 |
| 2019/0291855 A1* | 9/2019 | Wang | B64C 27/20 |
| 2020/0031460 A1* | 1/2020 | Millhouse | B64C 39/024 |
| 2020/0055594 A1* | 2/2020 | Tal | B64C 29/0025 |
| 2020/0148337 A1* | 5/2020 | Ni | B64C 39/024 |
| 2020/0283134 A1* | 9/2020 | Mores | B64C 27/10 |
| 2020/0324893 A1* | 10/2020 | Mills | B64C 37/02 |
| 2020/0346746 A1* | 11/2020 | Duffy | B64C 27/08 |
| 2021/0129979 A1* | 5/2021 | Wang | B64C 1/30 |
| 2022/0007567 A1* | 1/2022 | Reabow | A01C 7/20 |
| 2022/0144426 A1* | 5/2022 | Dearman | B64C 29/02 |

FOREIGN PATENT DOCUMENTS

WO   WO 2018/142925   8/2018
WO   WO 2018/206782   11/2018

OTHER PUBLICATIONS

Machine-generated English language translation of the abstract of CN 106956771, downloaded from Espacenet.com on Oct. 28, 2020.
Machine-generated English language translation of the abstract of WO 2018/142925, downloaded from Espacenet.com on Oct. 28, 2020.
Printout of webpage for Bell Nexus from Bell Flight, 2018, downloaded from BellFlight.com on May 24, 2019.

* cited by examiner

US 11,673,657 B2

MULTI-ROTOR ROTORCRAFT

RELATED APPLICATION

This applications claims priority to U.S. Provisional Patent Application No. 62/843,231, entitled ROTORCRAFTS and filed on May 3, 2019, and the complete disclosure of which is incorporated herein by reference.

FIELD

The present disclosure relates to multi-rotor rotorcraft.

BACKGROUND

Multi-rotor rotorcraft, including autonomous rotorcraft, are increasingly being developed for transporting cargo and human passengers. Such rotorcraft have different design considerations than traditional helicopters and recreational autonomous rotorcraft, including weight considerations, safety considerations, considerations associated with loading and unloading cargo and/or human passengers to and from a rotorcraft, and other considerations.

SUMMARY

Multi-rotor rotorcraft and methods of assembling a multi-rotor rotorcraft are disclosed herein. Multi-rotor rotorcraft comprise a fuselage and at least four rotor assemblies that are operatively supported by and spaced-around the fuselage. Each of the at least four rotor assemblies defines a spin volume and a spin diameter. Some multi-rotor rotorcraft further comprise at least one rotor guard that is fixed relative to the fuselage, that borders the spin volume of at least one of the at least four rotor assemblies, and that is configured to provide a visual indication of and safety barrier to the spin volume of the at least one of the at least four rotor assemblies. Various configurations of rotor guards are disclosed.

DESCRIPTION

Multi-rotor rotorcraft are disclosed herein. Generally, in FIG. 1, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure. Moreover, elements that are illustrated in broken lines may be important to some examples of the present disclosure.

Figure 1:
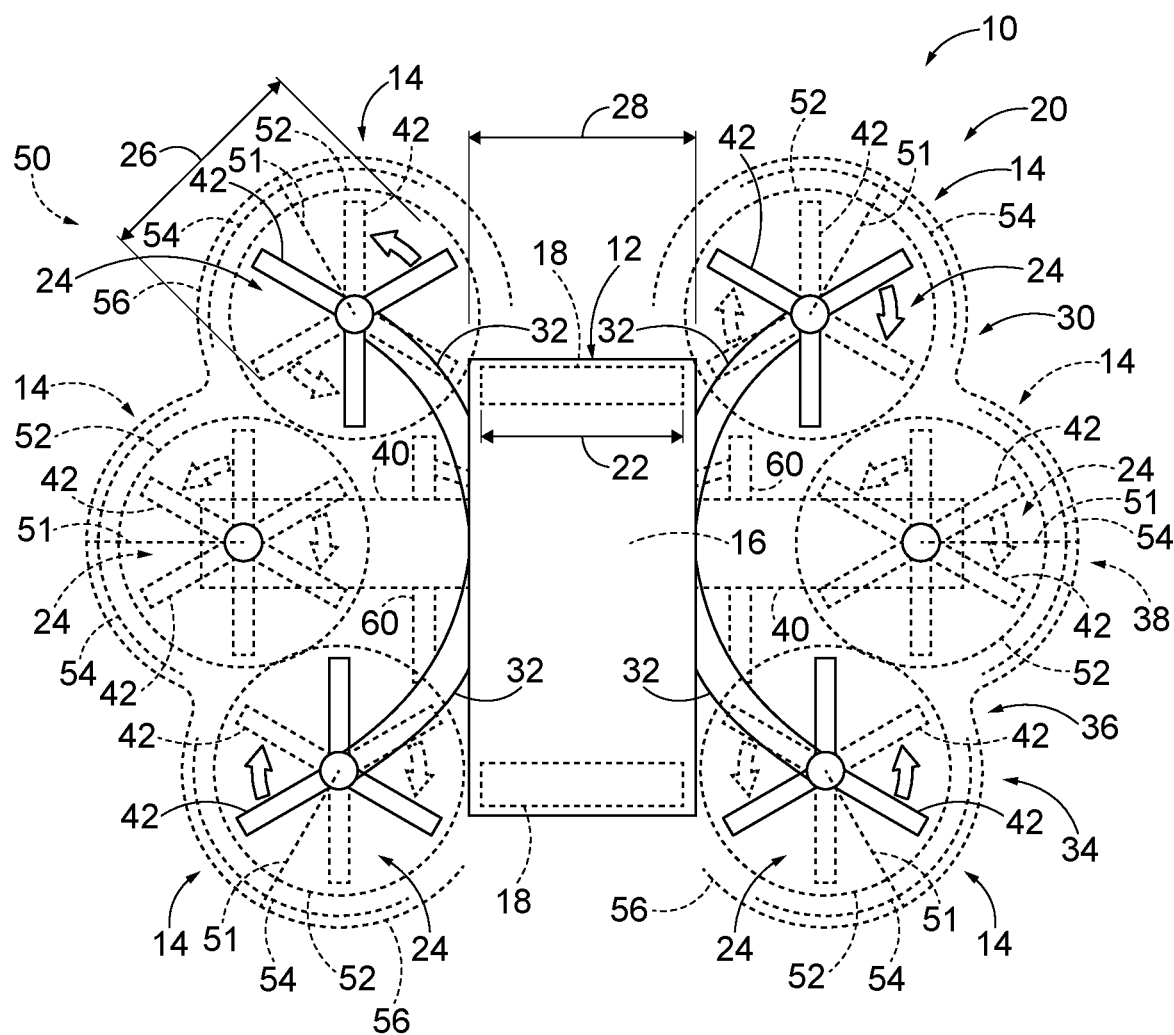
FIG. 1 is a schematic plan view diagram representing example multi-rotor rotorcraft according to the present disclosure.

With reference to FIG. 1, multi-rotor rotorcraft 10, which may be referred to herein simply as rotorcraft 10 or as a multi-rotor vehicle 10, comprise a fuselage 12 and at least four rotor assemblies 14 that are operatively supported by and spaced-around the fuselage 12. Each of the at least four rotor assemblies 14 defines a spin volume 24 and a spin diameter 26. As used herein, a "spin volume" is an imaginary cylindrical volume defined by the outer most extent of a rotor assembly's rotors when spinning. As used herein, a "spin diameter" is the diameter of a corresponding spin volume.

Some rotorcraft 10 may be unmanned and/or autonomous and therefore may be described as autonomous rotorcraft. Additionally or alternatively, some rotorcraft 10 may be pilot operated or at least configured to be pilot operated. In some such examples, the pilot may be onboard the rotorcraft 10, and thus the rotorcraft may be described as a manned rotorcraft. In some examples, rotorcraft 10 may be configured to be piloted remotely and therefore may be described as a remote-controlled rotorcraft. Rotorcraft 10 may be used to transport a payload, such as cargo or human passengers.

Figure 2:
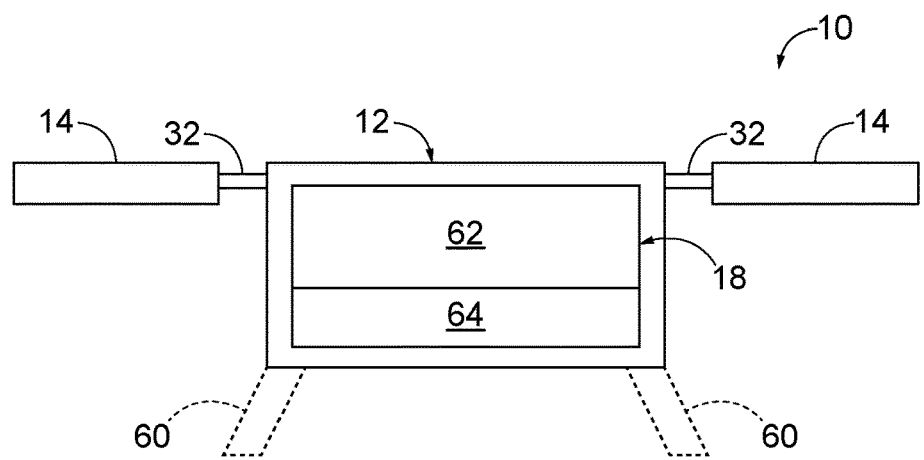
FIG. 2 is a schematic end view diagram representing example multi-rotor rotorcraft according to the present disclosure with a two-part access door shown closed in a closed configuration.
Figure 3:
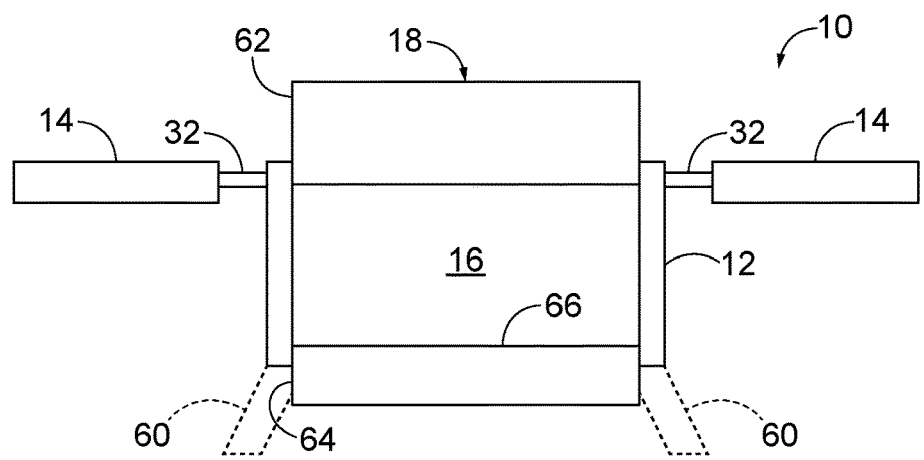
FIG. 3 is another schematic end view diagram representing example multi-rotor rotorcraft according to the present disclosure with a two-part access door shown in a fully open configuration.

In some examples of rotorcraft 10, the fuselage 12 comprises an internal compartment 16 and an access door 18 that has a door-width 22. The access door 18 provides selective access to the internal compartment 16. Some examples of rotorcraft 10 include more than one access door 18 as optionally and schematically illustrated in FIG. 1. Various configurations of access doors 18 may be incorporated into a rotorcraft 10, including access doors that are hinged or otherwise pivot between a closed configuration and a fully open configuration. With reference to FIGS. 2 and 3, in some examples of rotorcraft 10, the access door 18 has more than one section, such as an upper section 62 and a lower section 64 that are configured to collectively provide selective access to the internal compartment 16. In some such examples, when the access door 18 is in the fully open configuration, the lower section 64 is at or below the level of a floor 66 if the internal compartment 16, when the rotorcraft 10 is operatively positioned on a horizontal ground surface. Accordingly, a payload may be easily loaded into and unloaded from the internal compartment 16 when the access door 18 is in the fully open configuration, for example from an adjacent loading structure, such as a wheeled cart. In some such examples, the lower section 64 may serve as a ramp from the ground surface or other loading structure to the floor 66 of the internal compartment 16. In other examples of rotorcraft 10, the access door 18 may only include a single section that translates and/or pivots upward to provide selective access to the internal compartment 16. In yet other examples of rotorcraft 10, the access door 18 may only include a single section that translates and/or pivots downward to provide selective access to the internal compartment 16. In some examples of rotorcraft 10, the internal compartment 16 has a volume of at least 0.5 cubic meters ($m^3$), of at least 1 $m^3$, of at least 1.5 $m^3$, of at least 2 $m^3$, of between 0.5 $m^3$ and 3 $m^3$, and/or at most 3 $m^3$.

Referring back to FIG. 1, in some such examples of rotorcraft 10 that include an access door 18, the at least four rotor assemblies 14 comprise a first pair 20 of rotor assemblies 14 positioned on opposing sides of the access door 18, and a spacing 28 between the spin volumes 24 of the first pair 20 of rotor assemblies 14 is at least 70%, at least 80%, at least 90%, at least 100%, at least 110%, or at least 120% of the door-width 22. In some applications, having the spacing 28 at least 100% of the door-width is important. Accordingly, a rectangular prismatic volume of space extending from the access door 18 away from the fuselage may be substantially void or completely void of structure of the rotorcraft 10, including the rotor assemblies 14 and related hardware, such as optional rotor guards 50 discussed herein. As a result, the loading and unloading of payload to and from the internal compartment 16 may be safely accomplished.

In some such examples of rotorcraft 10, the internal compartment 16 is sized to selectively receive cargo, and the access door 18 is sized to permit loading and unloading of cargo into and from the internal compartment 16. Such rotorcraft 10 may be described as cargo aircraft.

Additionally or alternatively, in some examples of rotorcraft 10, the internal compartment 16 is configured for transportation of at least one human passenger, and the access door 18 is sized for entry and exit of the at least one human passenger to and from the internal compartment 16. Such rotorcraft 10 may be described as passenger aircraft.

With continued reference to FIG. 1, in some examples of rotorcraft 10, the at least four rotor assemblies 14 comprise a first pair 20 of rotor assemblies positioned on opposing lateral sides of the fuselage 12, and the rotorcraft 10 further comprises a first pair 30 of elongate support arms 32. Elongate support arms 32 additionally or alternatively may be described as support beams or booms. Each elongate support arm 32 interconnects a respective one of the first pair 20 of rotor assemblies 14 to the fuselage 12. The lengths of the elongate support arms 32, and thus the location of the respective rotor assemblies 14 relative to the fuselage 12, may be optimized for maneuverability and stability of the rotorcraft 10, as well as for the spacing 28 discussed above.

As schematically illustrated in FIG. 1, in some examples, each elongate support arm 32 of the first pair 30 of elongate support arms 32 extends along a respective curved path between the fuselage 12 and the respective one of the first pair 20 of rotor assemblies 14. In some such examples, when viewed from above, each respective curved path is concave away from the fuselage 12. However, also within the scope of the present disclosure are elongate support arms 32 whose respective curved paths are convex away from the fuselage 12, as well as elongate support arms 32 that are straight or generally straight. Curved support arms may provide for reduced weight compared to similarly configured rotorcraft with straight or substantially straight booms that support respective rotor assemblies. Additionally or alternatively, curved support arms may result in reduced acoustic interference noise compared to similarly configured rotorcraft with straight or substantially straight booms that support respective rotor assemblies.

In some examples of rotorcraft 10, the at least four rotor assemblies 14 further comprise a second pair 34 of rotor assemblies 14 that also are positioned on the opposing lateral sides of the fuselage 12, and the rotorcraft 10 further comprises a second pair 36 of elongate support arms 32. Each elongate support arm 32 of the second pair 36 interconnects a respective one of the second pair 34 of rotor assemblies 14 to the fuselage 12. In some such examples, each elongate support arm 32 of the second pair 36 of elongate support arms 32 extends along a respective curved path between the fuselage 12 and the respective one of the second pair 34 of rotor assemblies 14. In some such examples, when viewed from above (e.g., when the rotorcraft 10 is positioned on a flat ground surface), each respective curved path is concave away from the fuselage 12.

With continued reference to FIG. 1, some examples of rotorcraft 10 further comprise a pair of aerodynamic structures 40 that extend from opposing lateral sides of the fuselage 12. In some examples, the aerodynamic structures 40 are wings that provide aerodynamic lift for the rotorcraft 10. In some examples, at least one rotor assembly 14 is supported by each one of the pair of aerodynamic structures 40 and thus may be described as aerodynamic lift support structures. In some such examples, the at least four rotor assemblies 14 comprise (i) a first pair 20 of rotor assemblies 14 positioned on opposing lateral sides of the fuselage 12 at a forward region of the rotorcraft 10, (ii) a second pair 34 of rotor assemblies 14 positioned on the opposing lateral sides of the fuselage 12 at a rearward region of the rotorcraft 10, and (iii) a third pair 38 of rotor assemblies 14 positioned on the opposing lateral sides of the fuselage 12 at a middle region of the rotorcraft, with each of the third pair 38 of rotor assemblies 14 being supported by one of the pair of aerodynamic structures 40. That is, in some such examples, the aerodynamic structures 40 extend generally from opposing lateral sides of a middle region of the rotorcraft 10, which may facilitate flight stability of the rotorcraft 10.

Figure 4:
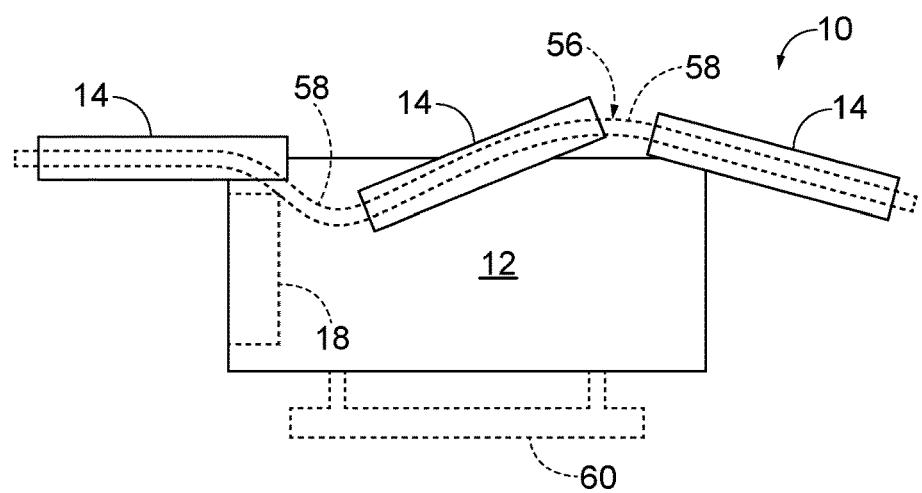
FIG. 4 is a schematic side view diagram representing example multi-rotor rotorcraft according to the present disclosure.
Figure 5:
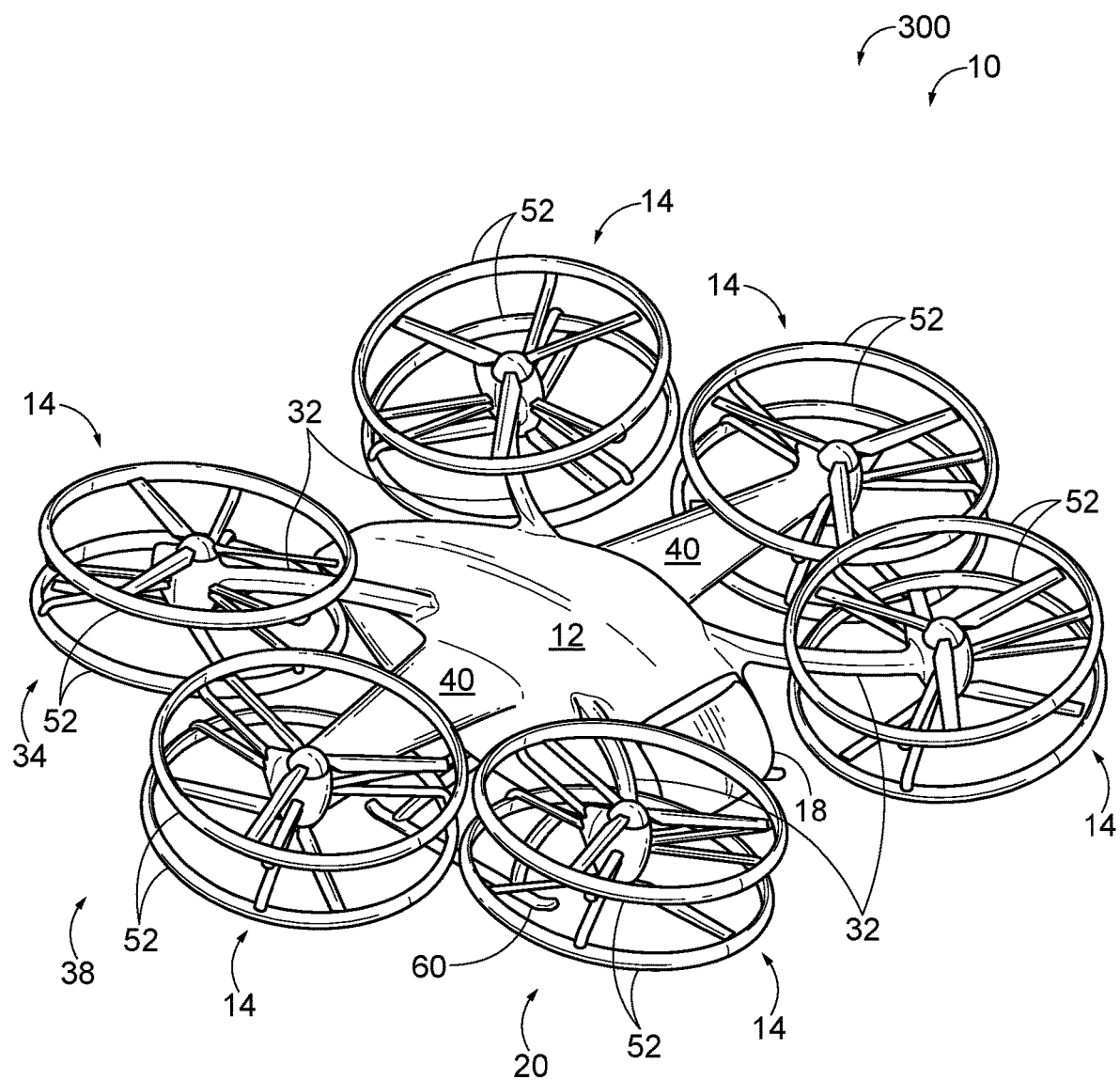
FIG. 5 is a perspective view of an example multi-rotor rotorcraft according to the present disclosure.
Figure 6:
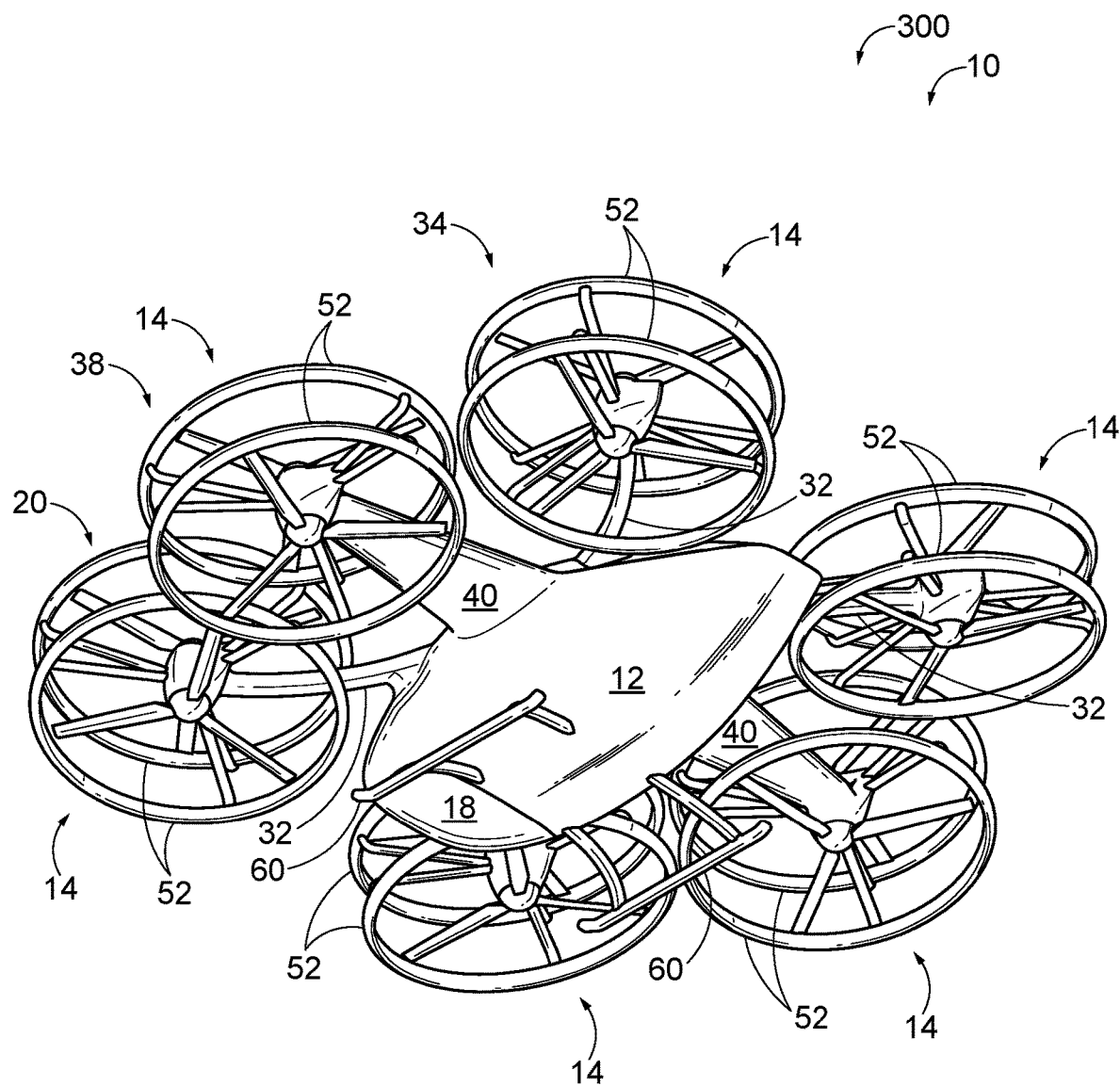
FIG. 6 is another perspective view of the multi-rotor rotorcraft of FIG. 5.
Figure 7:
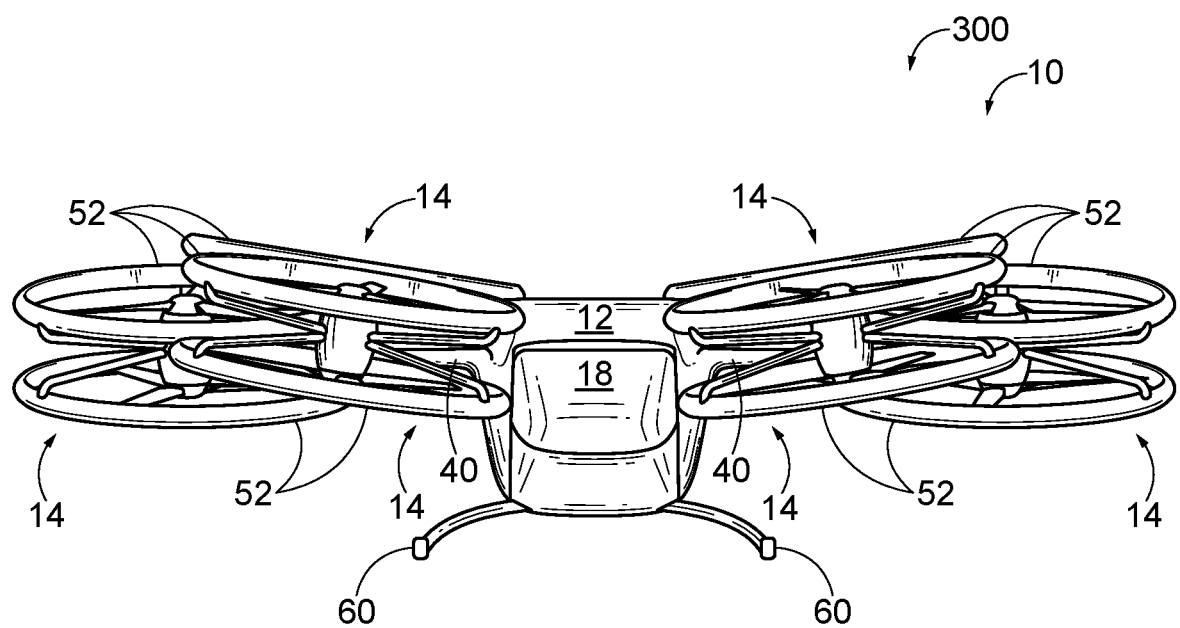
FIG. 7 is a front view of the multi-rotor rotorcraft of FIG. 5.
Figure 8:
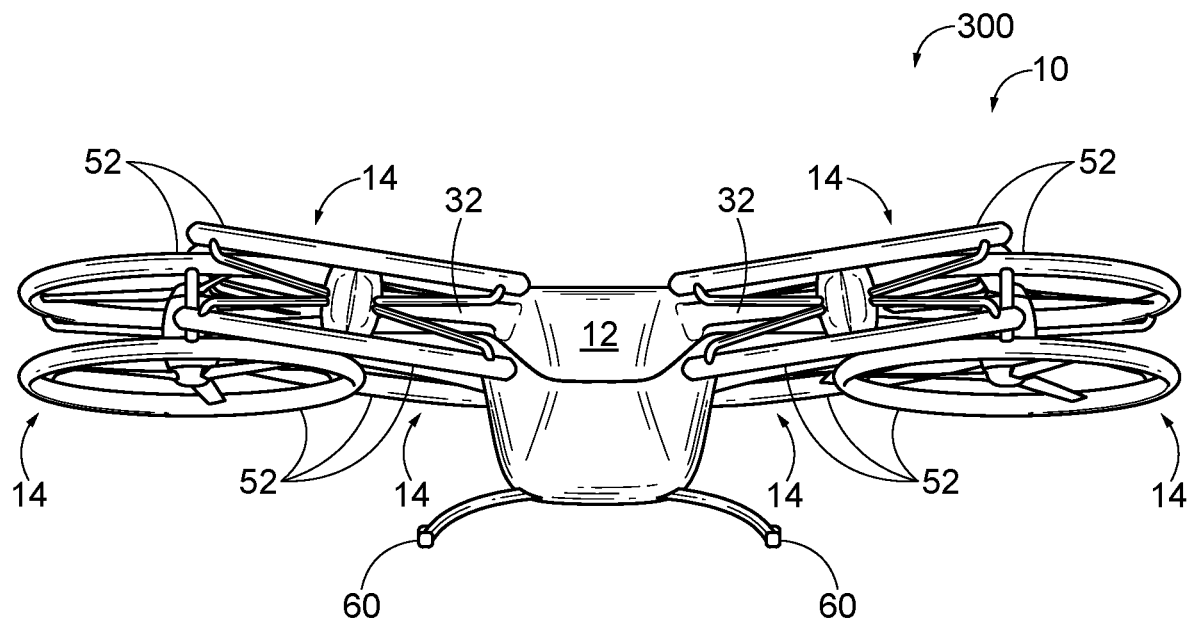
FIG. 8 is a rear view of the multi-rotor rotorcraft of FIG. 5.
Figure 9:
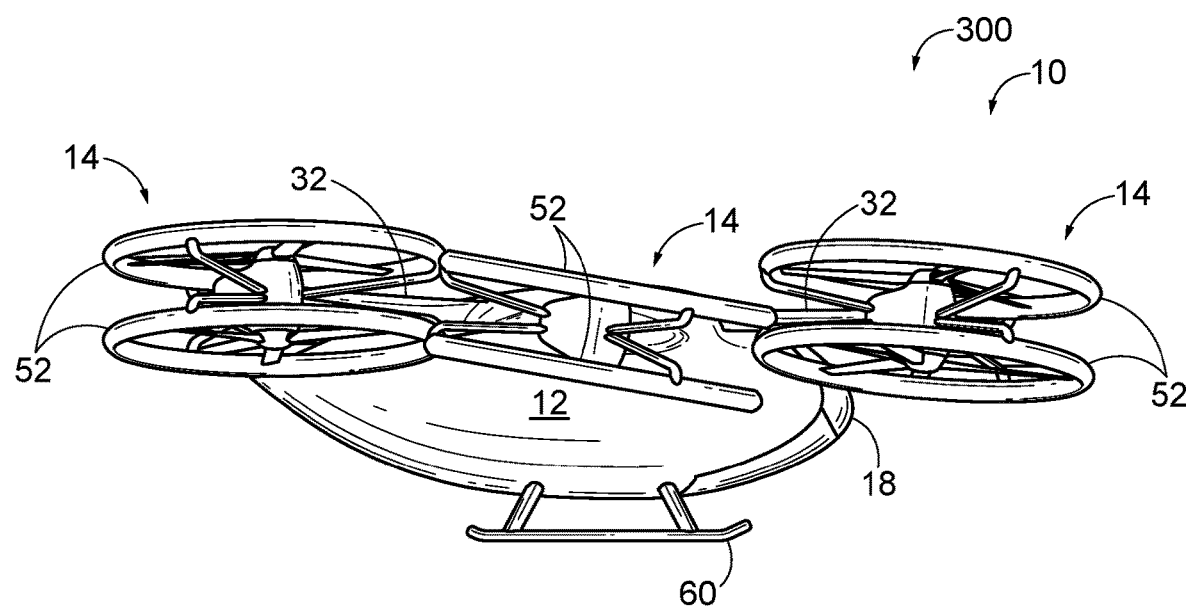
FIG. 9 is a right side view of the multi-rotor rotorcraft of FIG. 5.
Figure 10:
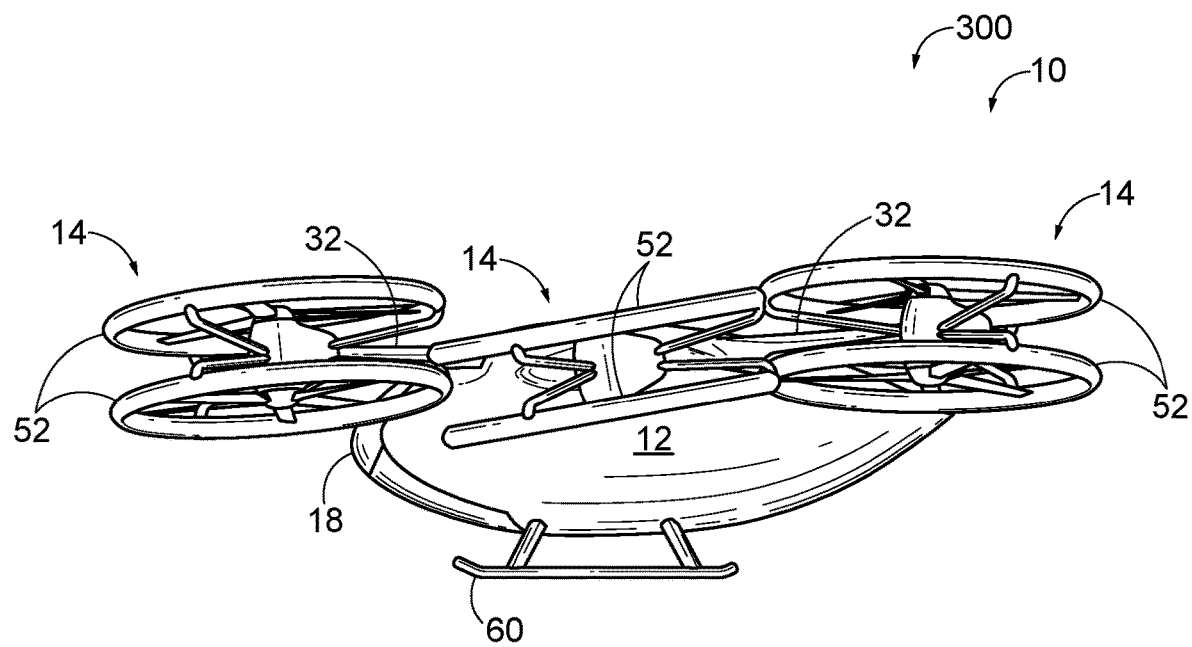
FIG. 10 is a left side view of the multi-rotor rotorcraft of FIG. 5.
Figure 11:
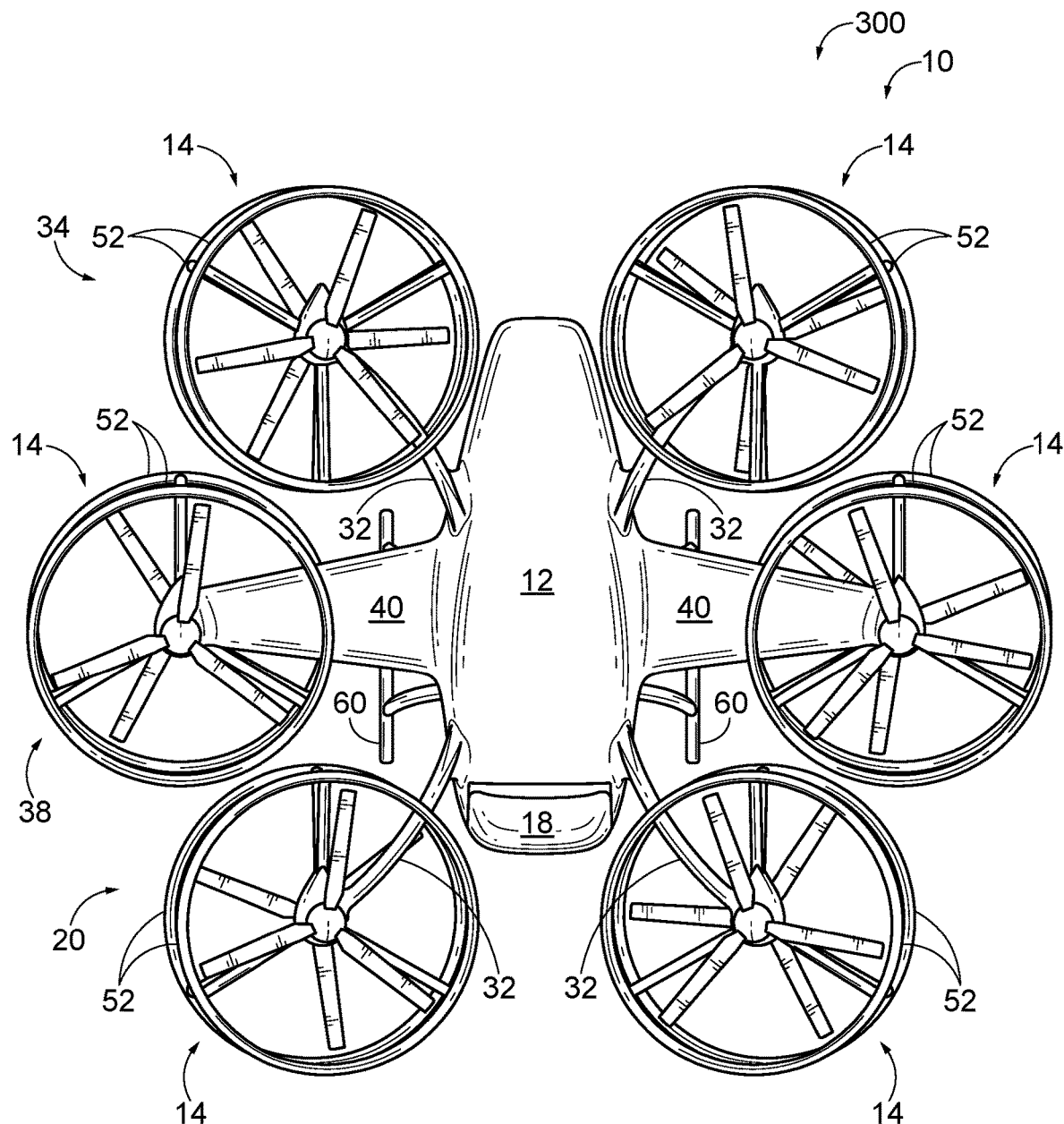
FIG. 11 is a top view of the multi-rotor rotorcraft of FIG. 5.
Figure 12:
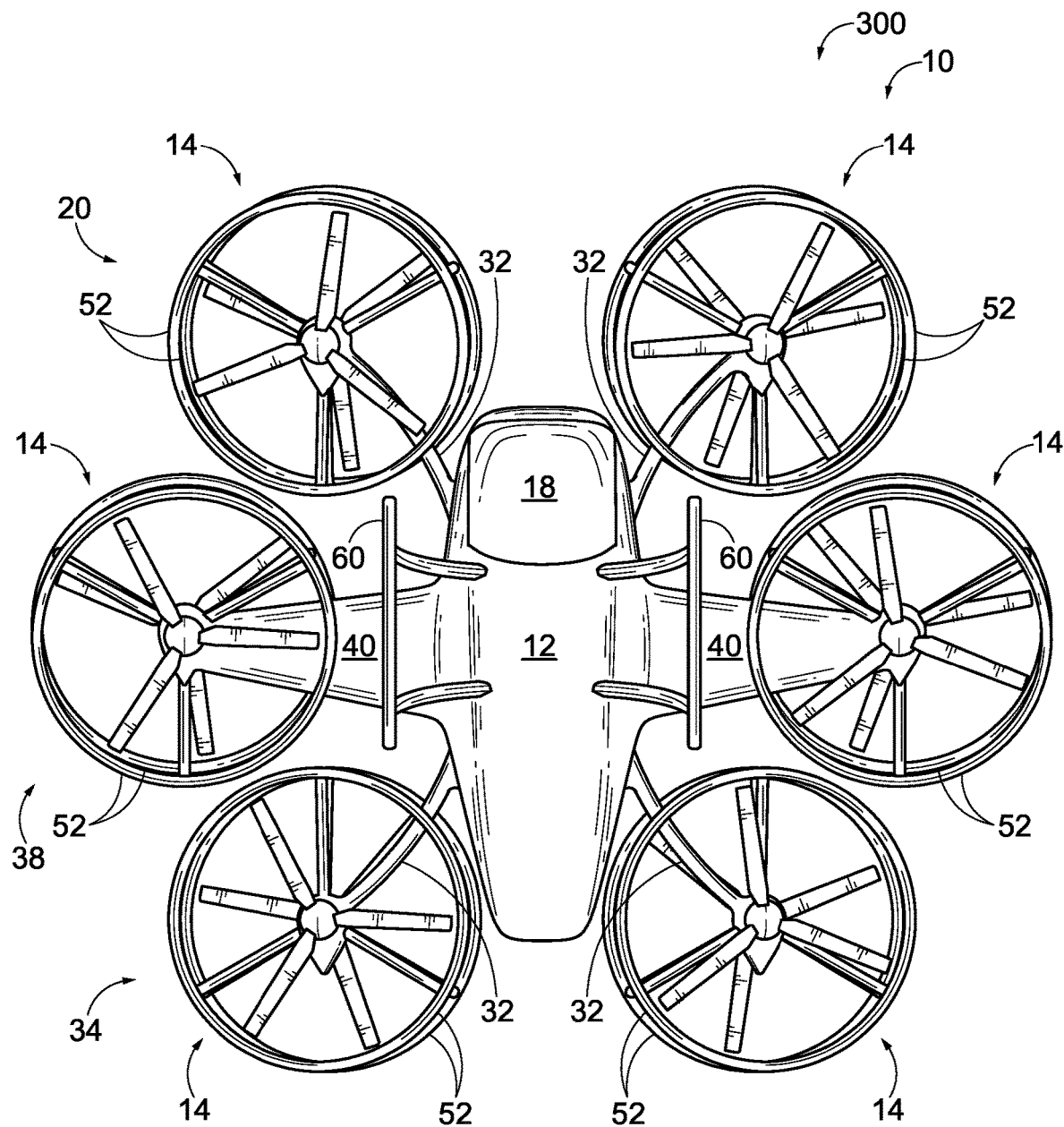
FIG. 12 is a bottom view of the multi-rotor rotorcraft of FIG. 5.

With continued reference to FIG. 1, in some examples of rotorcraft 10, each rotor assembly 14 of the at least four rotor assemblies 14 comprises a pair of co-axial rotors 42. In some such examples, the pair of co-axial rotors 42 of a first set of rotor assemblies 14 are configured to counter-rotate, and the pair of co-axial rotors 42 of a second set of rotor assemblies 14 are configured to co-rotate. In the schematic example of FIG. 1, the rotor assemblies 14 of the first pair 20 and the second pair 34 are co-rotating rotor assemblies, and the rotor assemblies of the third pair 38 are counter-rotating rotor assemblies; however, other configurations are within the scope of the present disclosure. Also, as schematically represented in FIG. 4, some examples of rotorcraft 10 comprise rotor assemblies 14 that are canted with respect to one or more of a yaw axis, a pitch axis, and/or a roll axis of the rotorcraft 10. Examples of canted counter-rotating and co-rotating rotor assemblies incorporated into a rotorcraft, and which may be incorporated into a rotorcraft 10 according to the present disclosure, are disclosed in U.S. patent application Ser. No. 16/035,245, the disclosure of which is incorporated herein by reference.

In the illustrated examples, each rotor 42 has three blades; however, rotorcraft 10 are not limited to having three-bladed rotors, and any suitable number of blades may be utilized, including two-bladed rotors, three-bladed rotors, four-bladed rotors, or rotors having more than four blades.

Referring back to FIG. 1, some rotorcraft 10 further comprise at least one rotor guard 50 that is fixed relative to the fuselage 12, that borders the spin volume 24 of at least one rotor assembly 14, and that is configured to provide a visual indication of the spin volume 24 of the associated rotor assembly 14. Accordingly, when the rotors of the associated rotor assembly 14 are spinning and may be difficult, impossible, or near impossible for a human to see, the associated rotor guard 50 provides a visual indication of where the spin volume 24 is located. In some examples, rotor guards 50 additionally or alternatively may be described as providing a safety barrier. In some examples, at least one rotor guard 50 borders each of the rotor assemblies 14 of a rotorcraft 10. In some examples, the rotor guard 50 borders the spin volume 24 of a rotor assembly 14 within a threshold distance. In some examples, the threshold distance is less than 10 cm, less than 5 cm, less than 3 cm, less than 2 cm, or less than 1 cm. In some examples, the threshold distance is at most 30% of the corresponding spin diameter 26, at most 20% of the corresponding spin diameter 26, at most 10% of the corresponding spin diameter 26, or at most 5% of the corresponding spin diameter 26. Accordingly, rotor guards 50 may be provided in close proximity to the corresponding rotor assembly or rotor assemblies 14 without significant overall increase in the size or volume of a rotorcraft 10. Rotor guards 50 may be fixed relative to the fuselage in any suitable manner. For example, as schematically represented in FIG. 1, rotor guards 50 may be supported by one or more support arms 51 that interconnect the rotor guards 50 to the associated rotor assemblies 14; however, other configurations also are within the scope of the present disclosure, including support arms or other structures that interconnect rotor guards directly to the fuselage 12, to an elongate support arm 32, or to an aerodynamic structure 40.

In some examples, a rotor guard 50 additionally may function as a duct to augment lift of the corresponding rotor assembly 14. Typically, in such examples, the threshold distance between the spin volume 24 and the rotor guard 50 is less than 1 cm.

In some examples, a rotor guard 50 is substantially parallel to a plane that is perpendicular to a spin axis of the corresponding adjacent rotor assembly 14 that it borders. In other words, in some examples, a rotor guard is substantially parallel to the spin diameter 26 of a corresponding rotor assembly 14. As a result, the rotor guard 50 provides a visual indication of the location of, and in some examples the extent of, the spin volume 24.

In some examples of rotorcraft 10, a rotor guard 50 comprises a circular rotor guard 52 that substantially encircles the spin volume 24 of a corresponding rotor assembly 14. By substantially encircle, it is meant that a circular rotor guard 52 does not necessarily fully encircle 360° of the spin volume 24 of the corresponding rotor assembly 14, but rather at least 75% of the spin volume 24. In some examples, a circular rotor guard 52 intersects or is engaged with another structure of the rotorcraft 10, such as (but not limited to) an elongate support arm 32 or an aerodynamic structure 40, such that the circular rotor guard 52 and the other structure collectively fully encircle the spin volume 24 of the corresponding rotor assembly 14.

Figure 13:
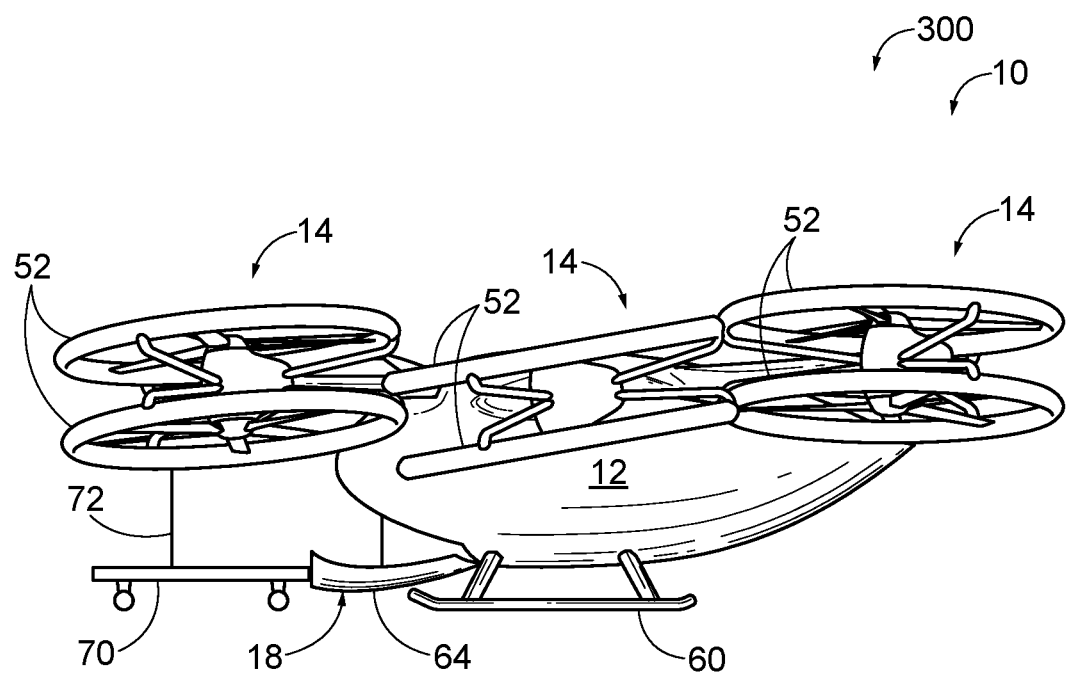
FIG. 13 is a left side view of the multi-rotor rotorcraft of FIG. 5, with its access door in a fully open configuration and shown receiving or dispensing cargo from or to a wheeled cart.
Figure 14:
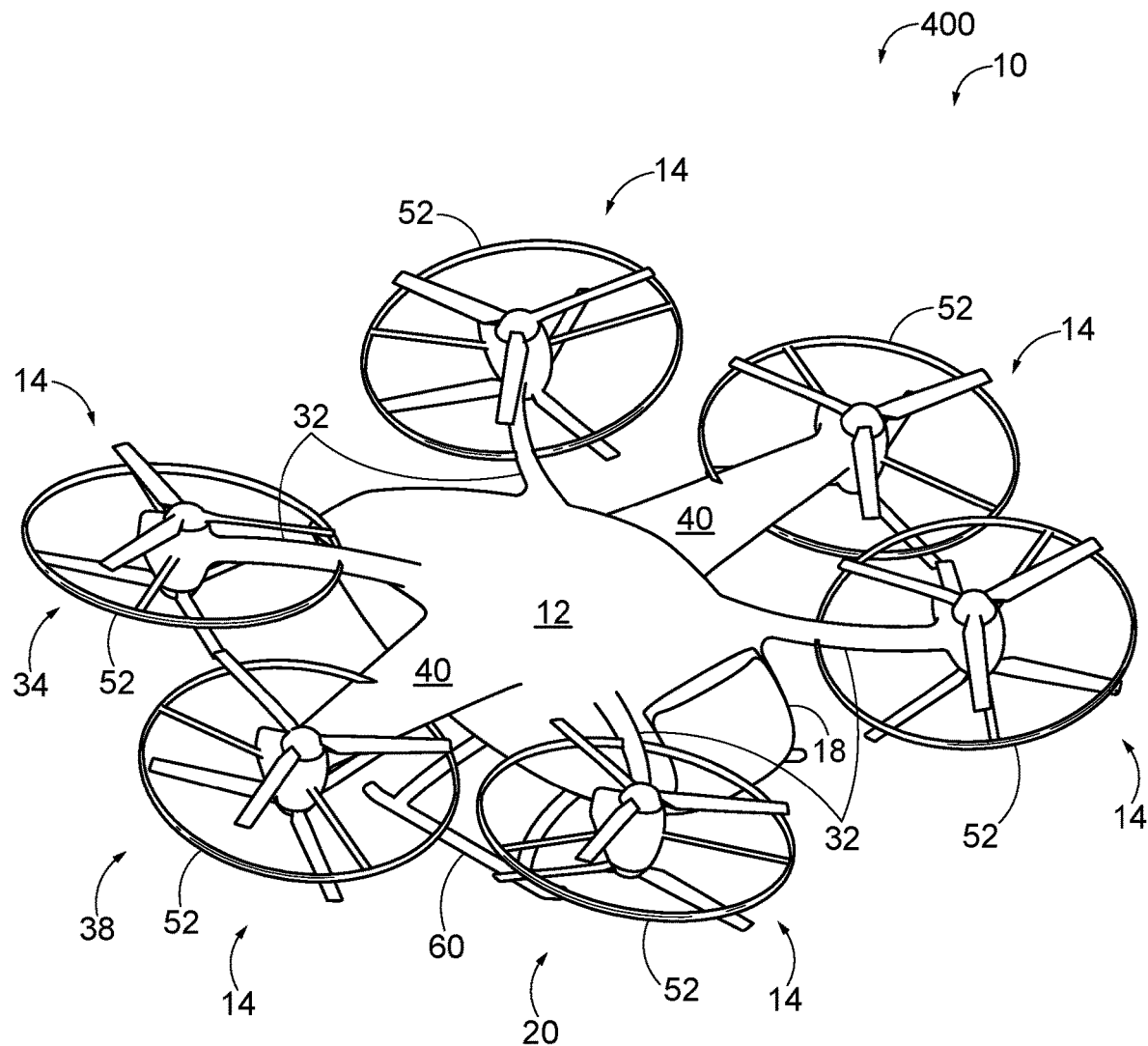
FIG. 14 is a perspective view of another example multi-rotor rotorcraft according to the present disclosure.
Figure 15:
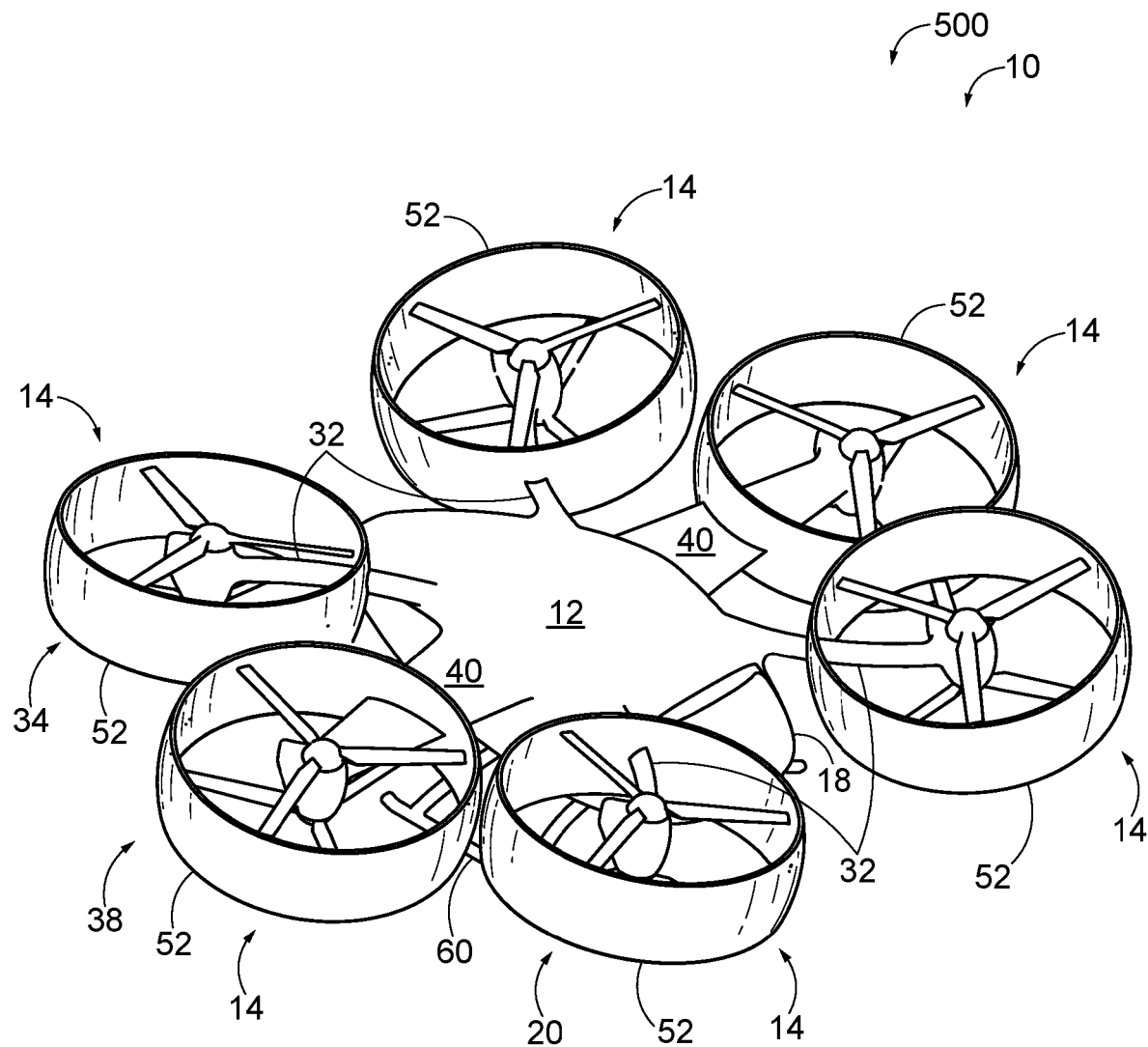
FIG. 15 is a perspective view of another example multi-rotor rotorcraft according to the present disclosure.

In some such examples in which a rotor assembly 14 comprises a pair of co-axial rotors 42, two circular rotor guards 52 substantially encircle the spin volume 24 of the pair of co-axial rotors 42. In other words, in such examples, a single circular rotor guard 52 borders each of the pair of co-axial rotors 42. The example rotorcraft 300 of FIGS. 5-13 is an example of such a rotorcraft 10. Such examples may provide for maximum visibility of the rotor assemblies 14 while reducing overall weight of the rotorcraft compared to other configurations of rotor guards. In other such examples in which a rotor assembly 14 comprises a pair of co-axial rotors 42, a single circular rotor guard 52 substantially encircles the combined spin volume 24 of both of the pair of co-axial rotors 42. The example rotorcraft 400 of FIG. 14 is an example of such a rotorcraft 10, and in rotorcraft 400, each circular rotor guard 52 is positioned generally between the two spin volumes of the adjacent rotors of a rotor pair. Such examples further reduce the overall weight of the rotorcraft compared to other configurations of rotor guards. The example rotorcraft 500 of FIG. 15 is another example of such a rotorcraft 10, but in rotorcraft 500, each circular rotor guard generally encompasses the spin volumes of both of the adjacent rotors of a rotor pair. When compared to rotorcraft 400, the circular rotor guards 52 of rotorcraft 500 provide for increased visibility but also result in an increase in overall weight and drag. That said, in some such examples, the circular rotor guard 52 may be configured as a duct to augment lift of the corresponding rotor assembly 14.

Figure 16:
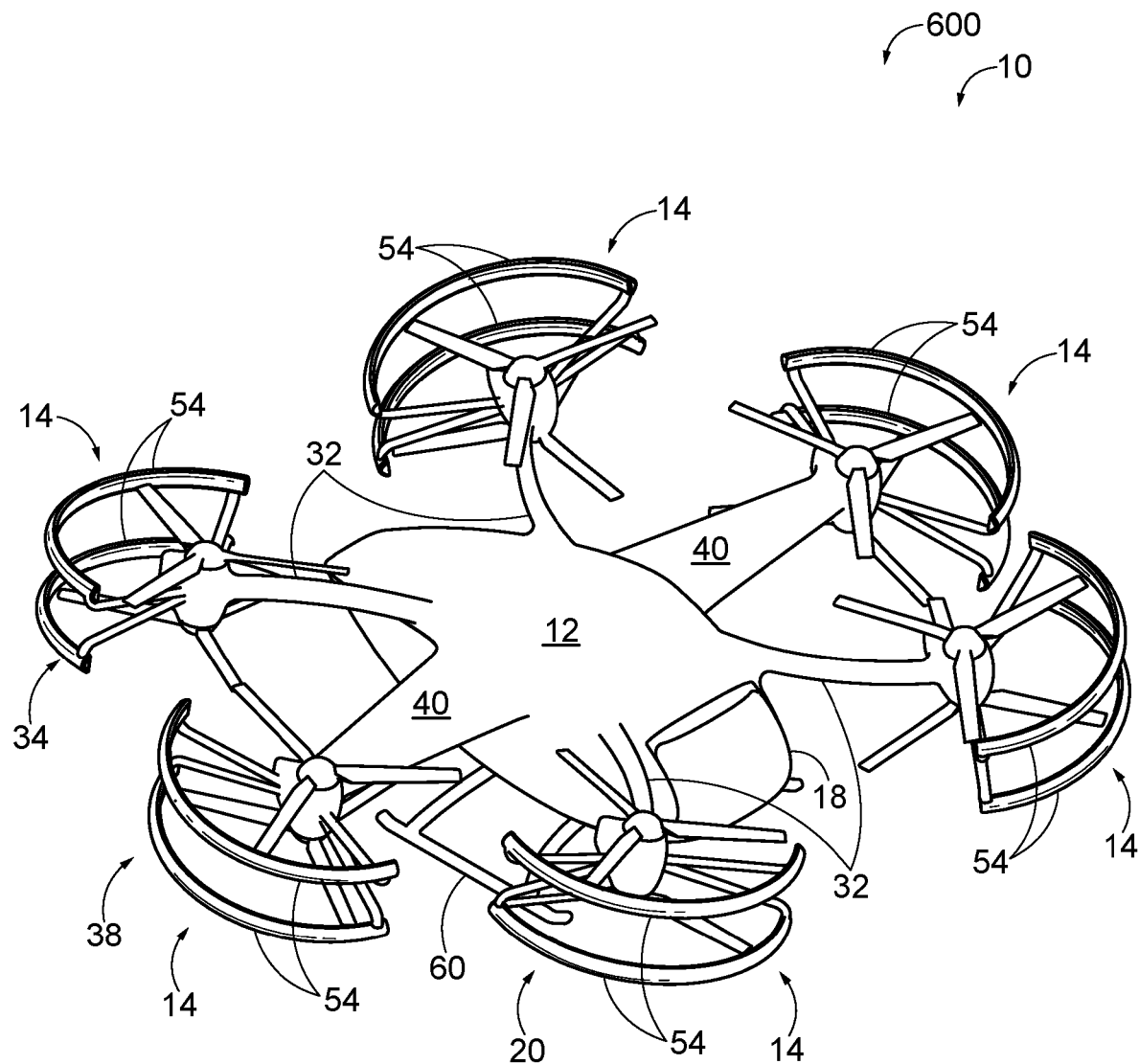
FIG. 16 is a perspective view of another example multi-rotor rotorcraft according to the present disclosure.
Figure 17:
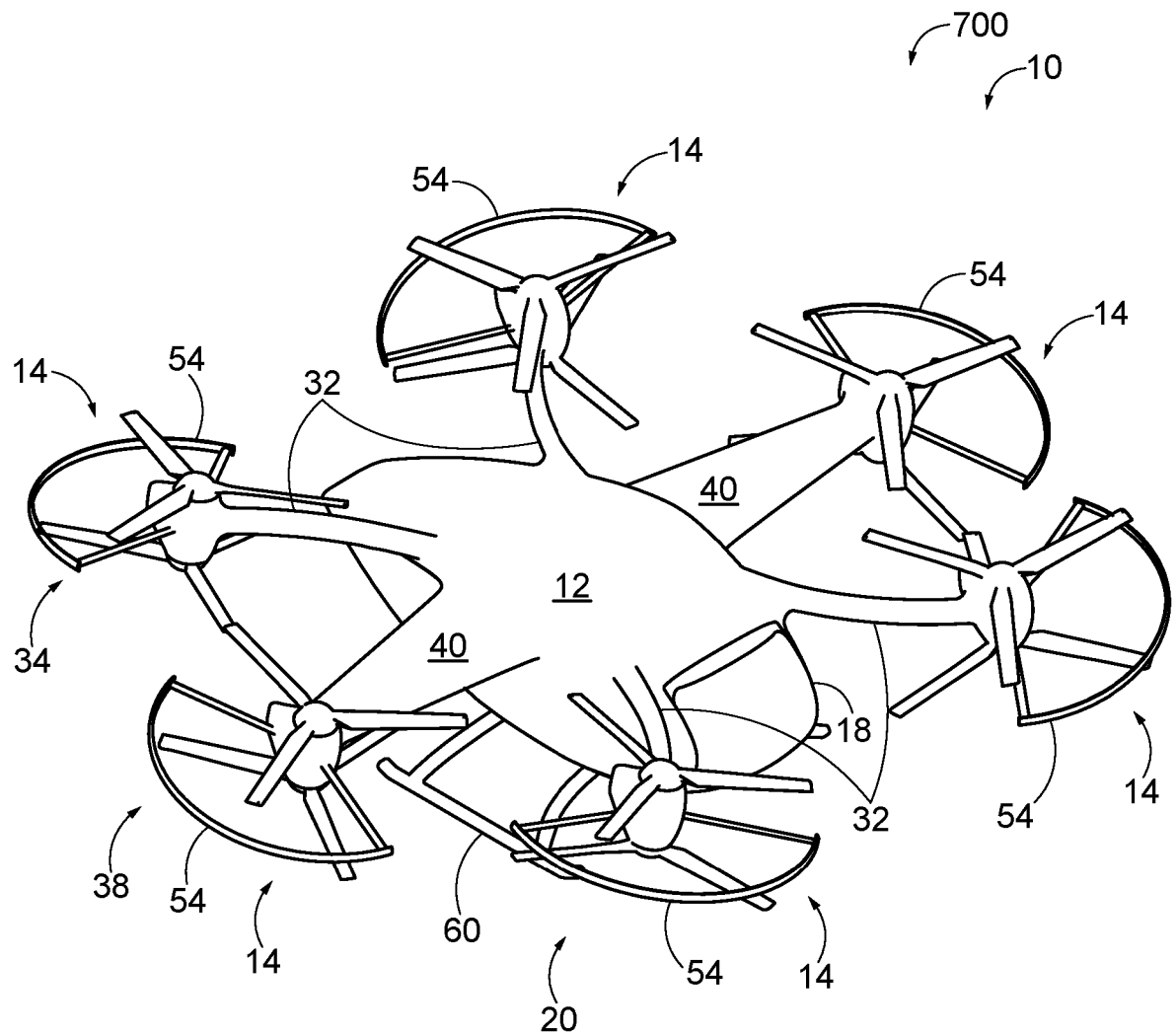
FIG. 17 is a perspective view of another example multi-rotor rotorcraft according to the present disclosure.
Figure 18:
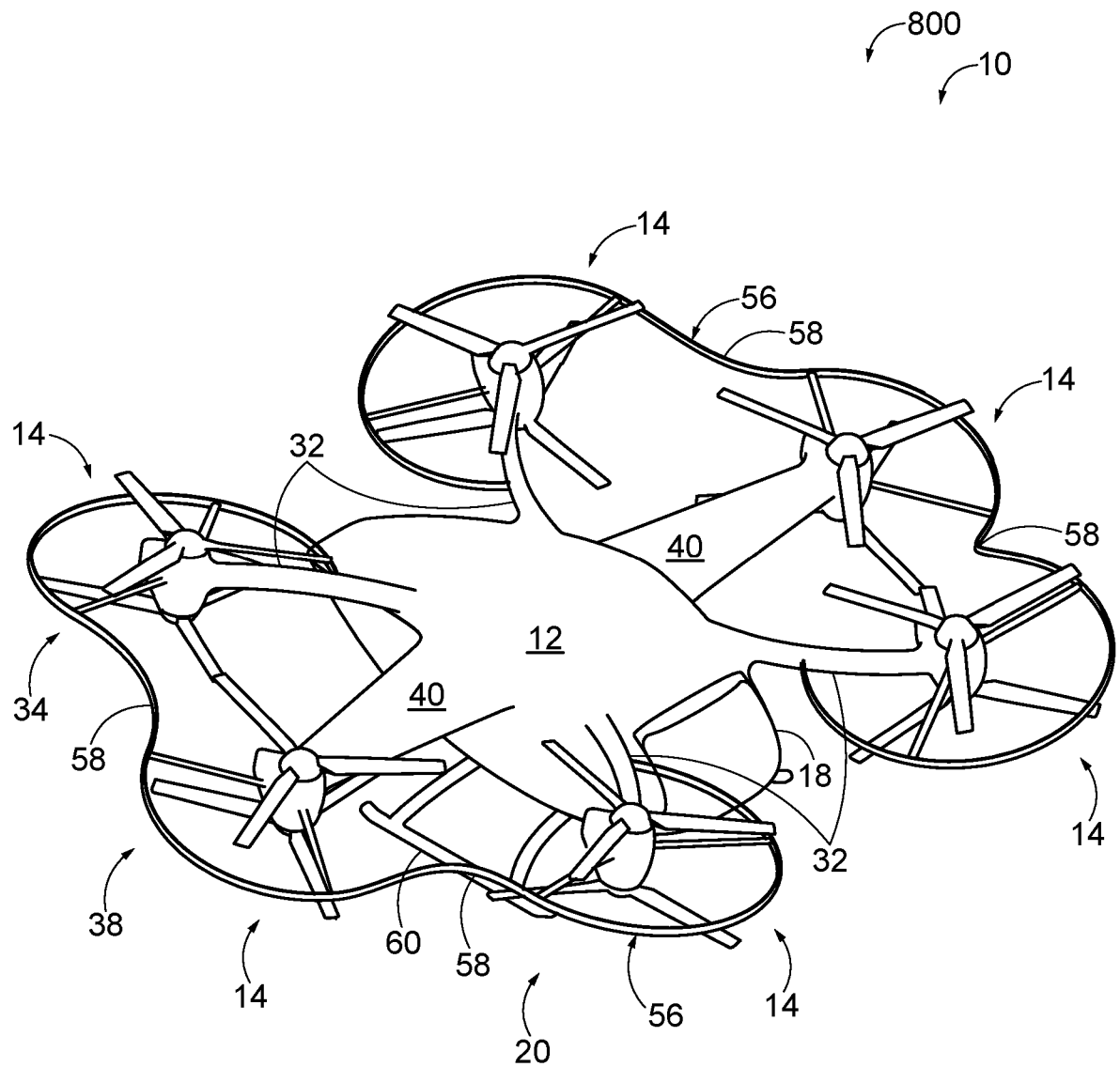
FIG. 18 is a perspective view of another example multi-rotor rotorcraft according to the present disclosure.
Figure 19:
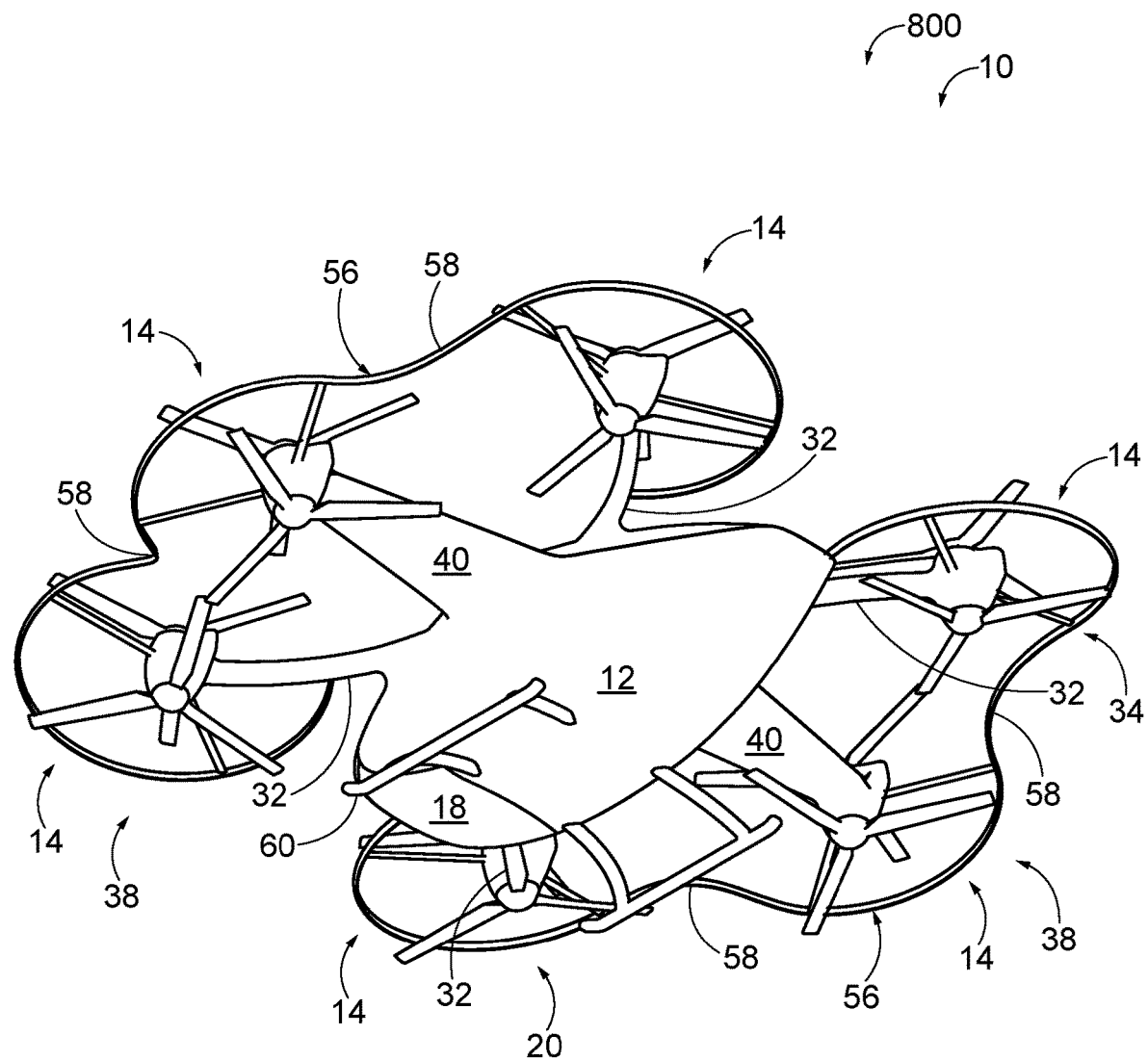
FIG. 19 is another perspective view of the multi-rotor rotorcraft of FIG. 18.
Figure 20:
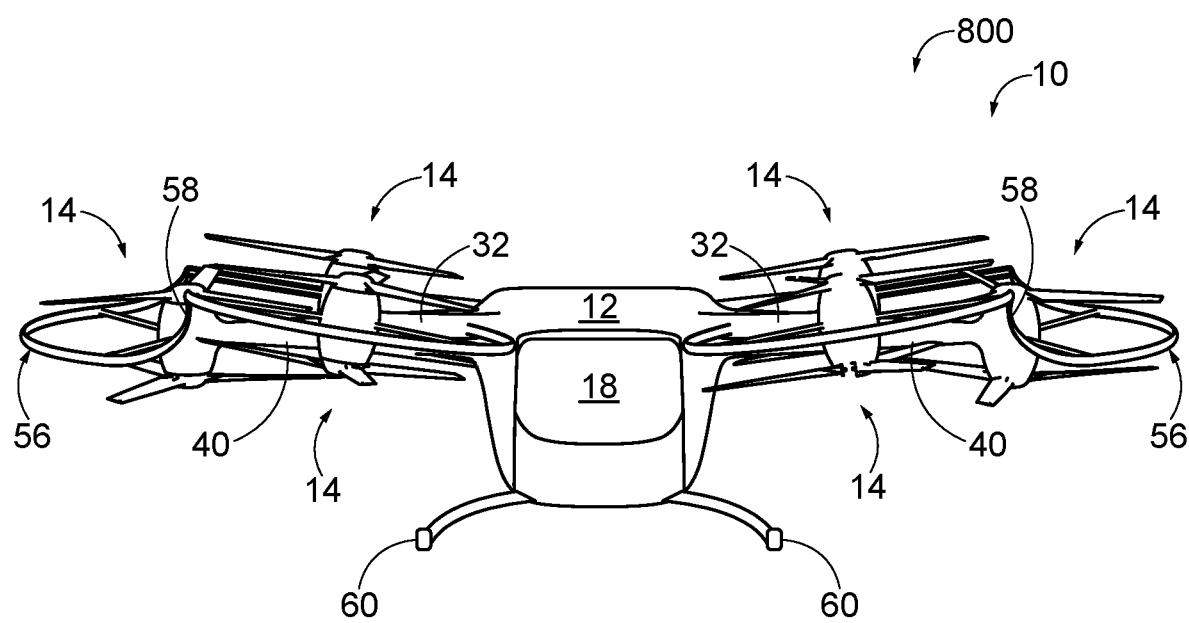
FIG. 20 is a front view of the multi-rotor rotorcraft of FIG. 18.
Figure 21:
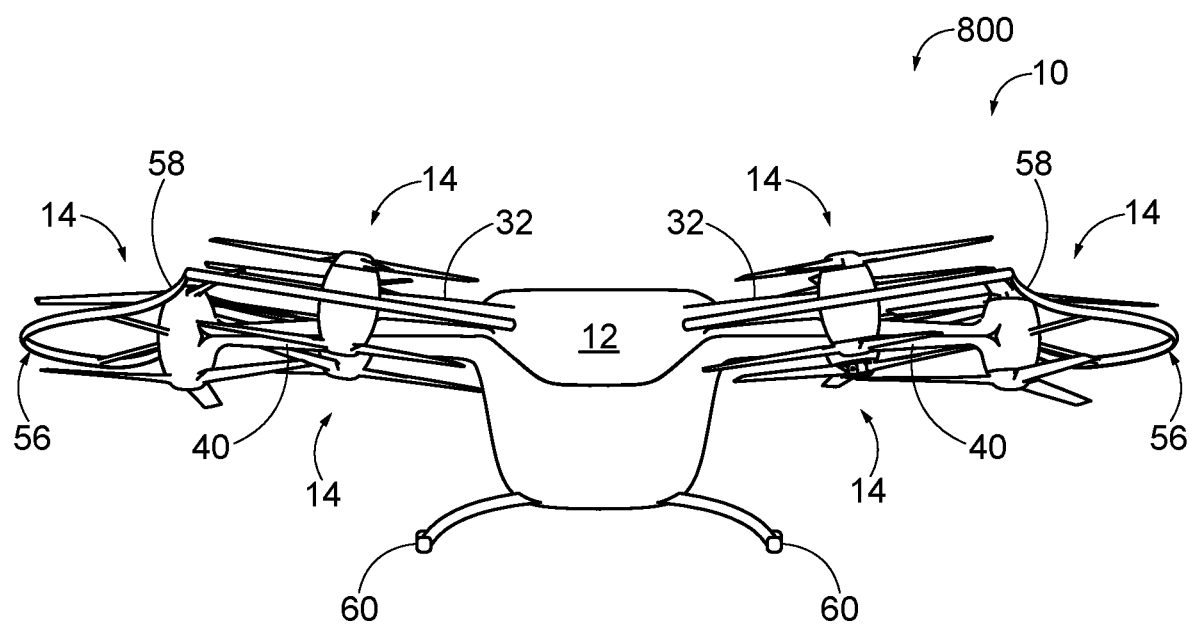
FIG. 21 is a rear view of the multi-rotor rotorcraft of FIG. 18.
Figure 22:
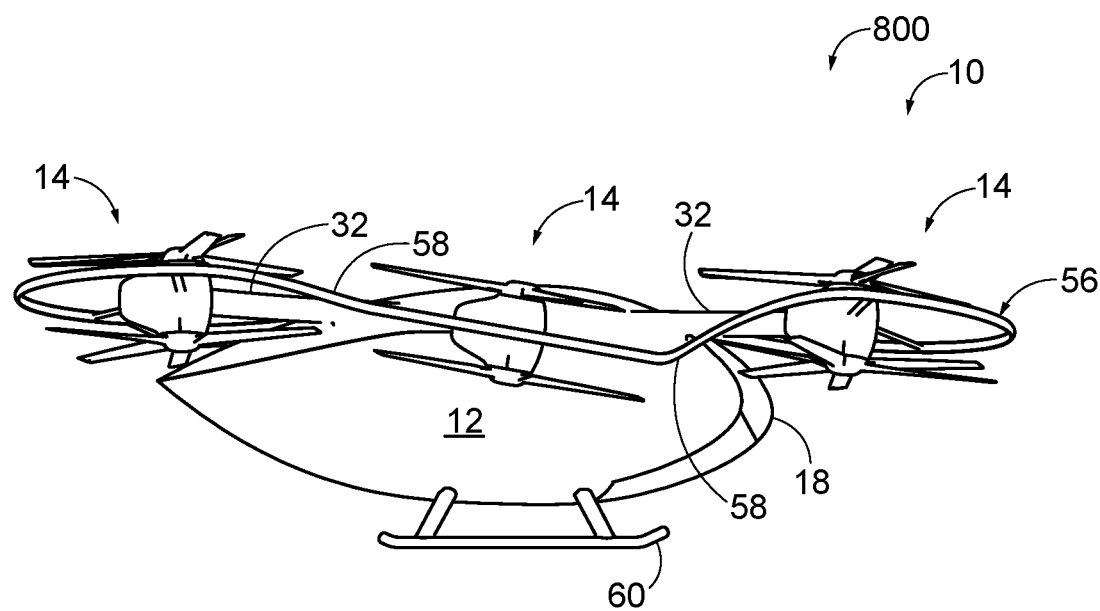
FIG. 22 is a right side view of the multi-rotor rotorcraft of FIG. 18.
Figure 23:
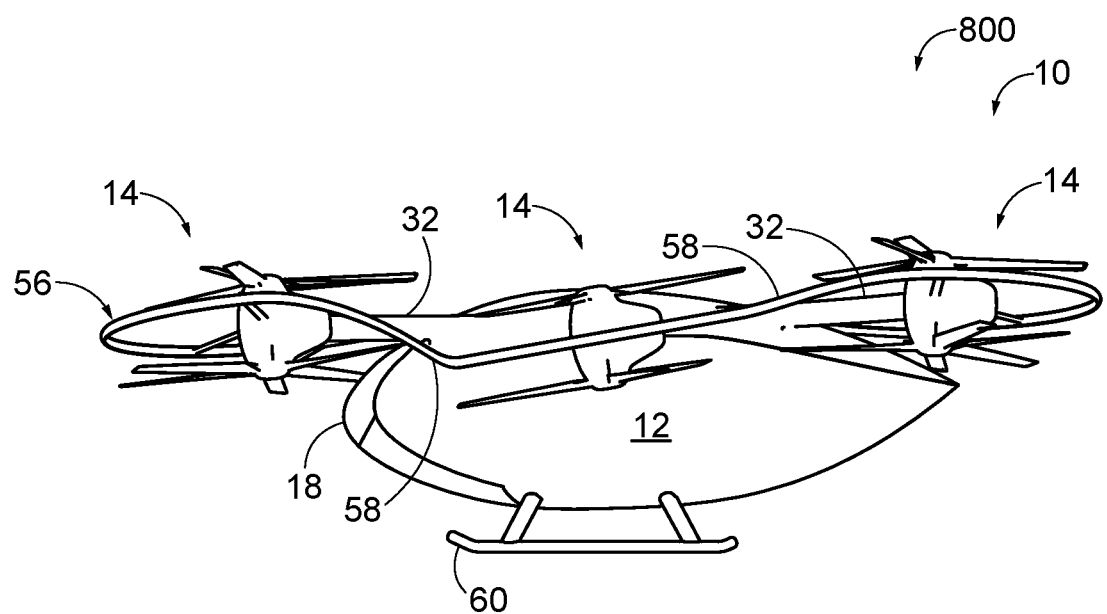
FIG. 23 is a left side view of the multi-rotor rotorcraft of FIG. 18.
Figure 24:
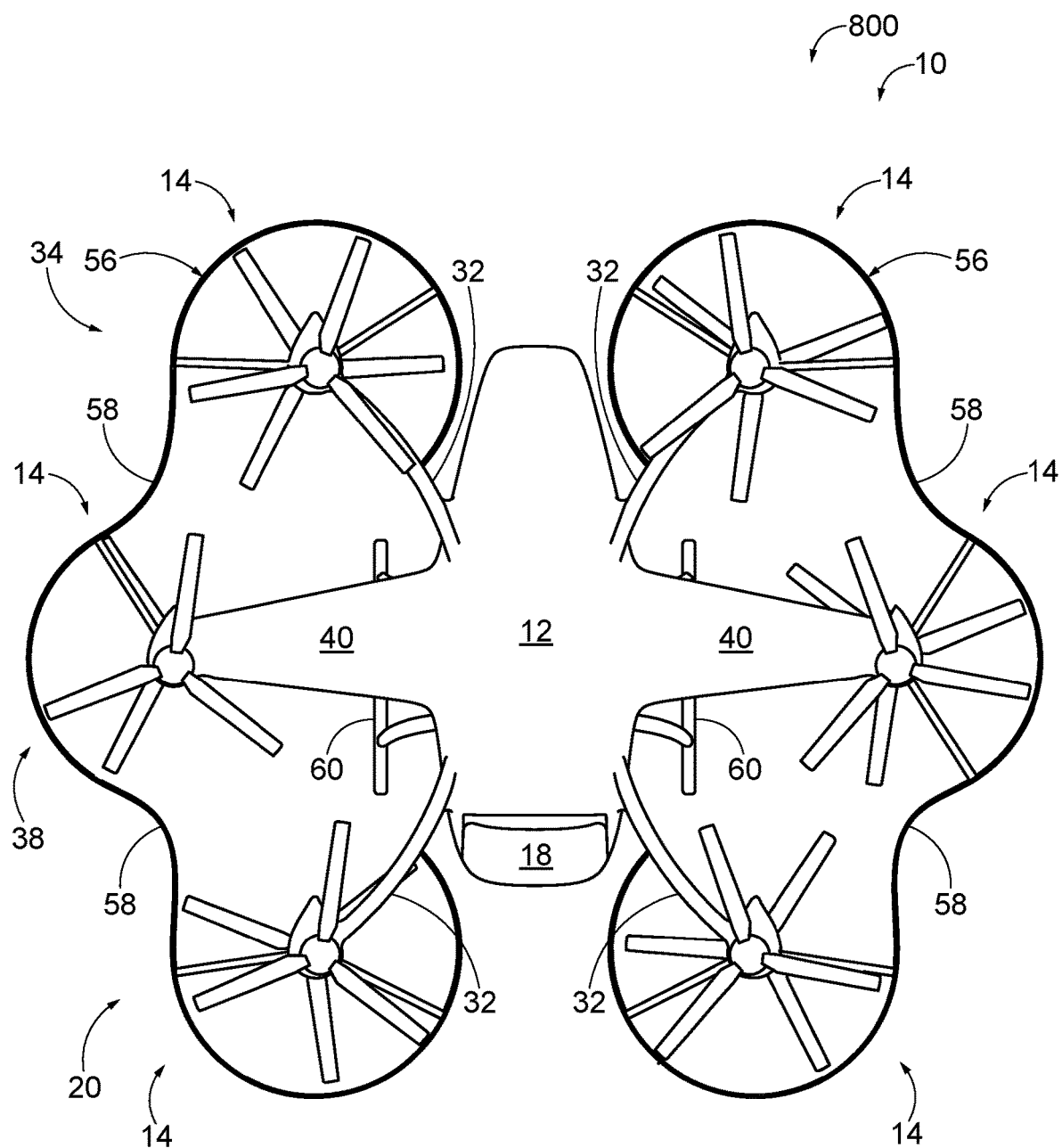
FIG. 24 is a top view of the multi-rotor rotorcraft of FIG. 18.
Figure 25:
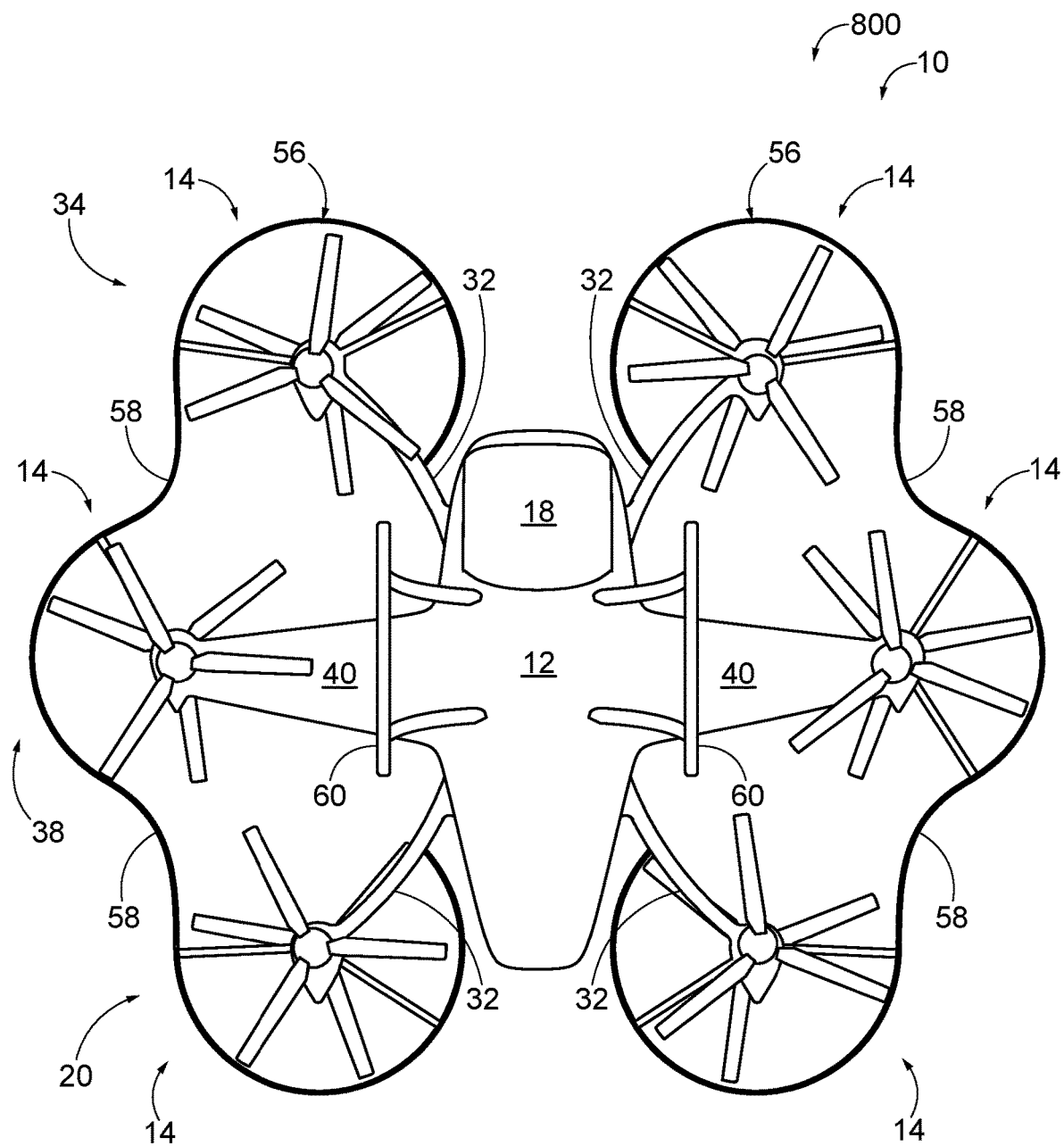
FIG. 25 is a bottom view of the multi-rotor rotorcraft of FIG. 18.

Referring back to FIG. 1, in some examples of rotorcraft 10, a rotor guard 50 comprises an arced rotor guard 54 that only partially borders the spin volume 24 of a corresponding rotor assembly 14, that is, that does not fully encircle a corresponding rotor assembly 14 as in the example of circular rotor guards 52. In some such examples, the arced rotor guard 54 borders at least 50%, at least 40%, at least 30%, at least 20%, at most 75%, at most 65%, at most 55%, and/or at most 45% of a circumferential perimeter of the corresponding spin volume 24. In some such examples, in which a rotor assembly 14 comprises a pair of co-axial rotors 42, two arced rotor guards 54 partially border the spin volume 24 of the pair of co-axial rotors 42. In other words, in such examples, a single arced rotor guard 54 borders each of the pairs of co-axial rotors 42. The example rotorcraft 600 of FIG. 16 is an example of such a rotorcraft 10. Such examples provide for reduced overall weight of the rotorcraft compared at least to the example rotorcraft 300 and 500 disclosed herein. In other such examples in which a rotor assembly 14 comprises a pair of co-axial rotors, a single arced rotor guard 54 borders the combined spin volume 24 of both of the pair of co-axial rotors 42. The example rotorcraft 700 of FIG. 17 is an example of such a rotorcraft 10, and in this illustrated example, each arced rotor guard 54 is positioned generally between the two spin volumes of the adjacent rotors of a rotor pair. Such examples further reduce the overall weight of the rotorcraft 700 compared to rotorcraft 600, for example.

Referring back to FIGS. 1 and 4, in some examples of rotorcraft 10, a rotor guard 50 comprises a combined rotor guard 56 that at least partially borders the spin volume 24 of more than one rotor assembly 14. Combined rotor guards 56 provide sufficient visibility of the corresponding spin volumes 24 while reducing overall weight when compared to other configurations of rotor guards. In the schematic representation of FIGS. 1 and 4, as well as the example rotorcraft 800 of FIGS. 18-25, in which the rotorcraft 10 comprises six rotor assemblies 14, each of two combined rotor guards 56 border the spin volumes 24 of three of the six rotor assemblies 14. Other configurations of combined rotor guards 56 are within the scope of the present disclosure and may be incorporated into a rotorcraft 10, such as depending on the total number of rotor assemblies 14, the relative spacing and positioning of the rotor assemblies 14, the canting (if any) of the rotor assemblies 14 or rotors 42 thereof, etc.

In some examples, a combined rotor guard 56 borders at least 50%, at least 40%, at least 30%, at least 20%, at most 75%, at most 65%, at most 55%, and/or at most 45% of a circumferential perimeter of the spin volume 24 of an adjacent corresponding rotor assembly 14. In some examples, a combined rotor guard 56 borders a greater portion of the circumferential perimeter of one or more spin volumes 24 than of the circumferential perimeter of another one of the spin volumes 24. For example, in the schematic representation of FIG. 1, the two combined rotor guards 56 each border a greater percentage of the circumferential borders of the corresponding spins volumes 24 of the first pair 20 and the second pair 34 of the rotor assemblies 14 than of the third pair 38 of the rotor assemblies. For example, as schematically represented, the two combined rotor guards 56 each border more than 50% of the spin volumes 24 of the respective rotor assemblies 14 of the first pair 20 and the second pair 34 and less than 50% of the spin volume 24 of the respective rotor assemblies 14 of the third pair 38. Other configurations of combined rotor guards 56 are within the scope of the present disclosure and may be incorporated into rotorcraft 10.

With reference to FIG. 4, in some examples, a combined rotor guard 56 comprises at least one segment 58 that is non-parallel to a plane that is perpendicular to a spin axis of an adjacent rotor assembly 14. Such a configuration may be particularly suited for rotorcraft 10 that have canted rotor assemblies 14, as discussed herein.

Rotorcraft 10 may include more than one configuration of rotor guards 50 and are not required to include only circular rotor guards 52, only arced rotor guards 54, or only combined rotor guards 56, and may include various combinations thereof, as well as other configurations of rotor guards 50. In some applications, for example, it may be desirable to utilize circular rotor guards 52 in positons on a rotorcraft 10 that are adjacent to areas where personnel or autonomous loading structures are routinely operating, such as in connection with the loading and/or unloading of cargo or human passengers, while other configurations of rotor guards 50 may be utilized elsewhere on such a rotorcraft 10.

With reference back to FIG. 1, some examples of rotorcraft 10 further comprise a skid gear 60 that is coupled to the fuselage 12 and that is configured to support the rotorcraft 10 in an upright orientation on a ground surface. When provided, the skid gear 60 provides a lightweight structure for supporting a rotorcraft 10. However, various forms of ground-contacting structure, or landing gear, may be incorporated into a rotorcraft 10, such as (but not limited to) one or more of wheeled structures, passive (e.g., non-motive) structures, motive (e.g., motorized) structures, steerable structures, non-steerable structures, etc.

Turning now to FIGS. 5-25, illustrative non-exclusive examples of rotorcraft 10 are illustrated. Where appropriate, the reference numerals from one or more of the schematic illustrations of FIGS. 1-4 are used to designate corresponding parts of the rotorcraft of FIGS. 5-25; however, the examples of FIGS. 5-25 are non-exclusive and do not limit rotorcraft 10 to the illustrated embodiments of FIGS. 5-25. That is, rotorcraft 10 may incorporate any number of the various aspects, configurations, characteristics, properties, etc. of rotorcraft 10 that are illustrated in and discussed with reference to the schematic representations of FIGS. 1-4 and/or the embodiments of FIGS. 5-25, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the embodiments of FIGS. 5-25; however, it is within the scope of the present disclosure that the previously discussed features, variants, etc. may be utilized with the embodiments of FIGS. 5-25.

FIGS. 5-25 illustrate examples of rotorcraft 10, designated as rotorcraft 300, rotorcraft 400, rotorcraft 500, rotorcraft 600, and rotorcraft 700. Each of rotorcraft 300, rotorcraft 400, rotorcraft 500, rotorcraft 600, and rotorcraft 700 comprises an access door 18 on the forward side of the fuselage 12 having an upper section 62 and a lower section 64. The spacing 28 between the spin volumes 24 of the first pair 20 of rotor assemblies 14 is greater than 100% of the door-width 22. Each of rotorcraft 300, rotorcraft 400, rotorcraft 500, rotorcraft 600, and rotorcraft 700 comprises six rotor assemblies 14, each having a pair of canted co-axial rotors 42. Each of rotorcraft 300, rotorcraft 400, rotorcraft 500, rotorcraft 600, and rotorcraft 700 comprises two pairs of curved elongate support arms 32 respectively supporting a first pair 20 and a second pair 34 of rotor assemblies, as well as a pair of aerodynamic structures 40 supporting a third pair 38 of rotor assemblies 14. Moreover, the curved elongate support arms 32 are concave away from the fuselage 12. Each of rotorcraft 300, rotorcraft 400, rotorcraft 500, rotorcraft 600, and rotorcraft 700 comprises a non-motive skid gear 60. However, each of rotorcraft 300, rotorcraft 400, rotorcraft 500, rotorcraft 600, and rotorcraft 700 differ in their respective rotor guards 50.

Rotorcraft 300 (FIGS. 5-13) comprises two circular rotor guards 52 for each rotor assembly 14, with a circular rotor guard 52 encircling the spin volume 24 of each rotor of the twelve total rotors. In FIG. 13, rotorcraft 300 is illustrated with its access door 18 in the fully open configuration and with a wheeled cart 70 abutted against the lower section 64 of the access door 18 and with an item of cargo 72 shown in the process of being loaded into or unloaded from the internal compartment 16. In the illustrated example, the lower section 64 of the access door 18 is configured to be aligned with the wheeled cart 70, so that the transfer of the item of cargo 72 to and from the internal compartment 16 is easily accomplished. Moreover, in the illustrated example, the lower section 64 of the access door 18, when in the fully open configuration has an upper surface that is generally horizontal to the ground surface and parallel to both the floor 66 of the internal compartment 16 and the upper surface of the wheeled cart 70, further facilitating the transfer of the item of cargo 72 to and from the internal compartment 16. Rotorcraft 10 and associated cargo loading structures additionally may include material handling structures to further facilitate the transfer of cargo 72, such as (but not limited to) rollers, conveyors, wheels, skates, etc. The configuration and use of the access door 18 and associated loading structure illustrated in FIG. 13 in connection with rotorcraft 300 may be utilized with any of the other examples of rotorcraft 10 disclosed herein, including rotorcraft 400, rotorcraft 500, rotorcraft 600, and rotorcraft 700.

Rotorcraft 400 (FIG. 14) comprises a singular circular rotor guard 52 for each rotor assembly 14, with the single circular rotor guard 52 positioned generally between the two spin volumes of the adjacent rotors. Moreover, the circular rotor guards 52 of rotorcraft 400 are examples of circular rotor guards 52 that intersect or are engaged with other structures of the rotorcraft 400 to fully encircle the respective rotor assemblies 14. More specifically, the forward two circular rotor guards 52 are engaged with the forward two elongate support arms 32, the rear two circular rotor guards 52 are engaged with the rear two elongate support arms 32, and the middle two circular rotor guards 52 are engaged with the aerodynamic structures 40.

Rotorcraft 500 (FIG. 15) comprises a singular circular rotor guard 52 for each rotor assembly 14, with the single circular rotor guard 52 generally encompassing the spin volumes of both of the adjacent rotors. Moreover, as with rotorcraft 400, the circular rotor guards 52 of rotorcraft 500 are examples of circular rotor guards 52 that intersect or are engaged with other structures of the rotorcraft 400 to fully encircle the respective rotor assemblies 14. More specifically, similar to rotorcraft 400, the forward two circular rotor guards 52 are engaged with the forward two elongate support arms 32, the rear two circular rotor guards 52 are engaged with the rear two elongate support arms 32, and the middle two circular rotor guards 52 are engaged with the aerodynamic structures 40.

Rotorcraft 600 (FIG. 16) comprises a two arced rotor guards 54 for each rotor assembly 14, with an arced rotor guard 54 bordering the spin volume 24 of each rotor of the twelve total rotors. Each arced rotor guard 54 of rotorcraft 600 borders about 40% of the circumferential perimeter (i.e., about 145°) of the corresponding spin volume 24.

Rotorcraft 700 (FIG. 17) comprises a singular arced rotor guard 54 for each rotor assembly 14, with the single arced rotor guard 54 positioned generally between the two spin volumes 24 of the adjacent rotors. Similarly to rotorcraft 600 of FIG. 16, each arced rotor guards 54 of rotorcraft 700 borders about 40% of the circumferential perimeter (i.e., about 145°) of the corresponding spin volume 24.

Rotorcraft 800 (FIGS. 18-25) comprises two combined rotor guards 56, one on each side of the rotorcraft 800. Each combined rotor guard 56 borders all three of the rotor assemblies 14 on the respective side of the rotorcraft 800. Rotorcraft 800 is an example in which the two combined rotor guards 56 each border more than 50% of the spin volumes 24 of the respective rotor assemblies 14 of the first pair 20 and the second pair 34 of rotor assemblies 14 and less than 50% of the spin volume 24 of the respective rotor assemblies 14 of the third pair 38 of rotor assemblies 14. Moreover, rotorcraft 800 is an example of a rotorcraft 10, in which the combined rotor guards 56 comprise segments 58 that are non-parallel to a plane that is perpendicular to a spin axis of an adjacent rotor assembly 14.

Figure 26:
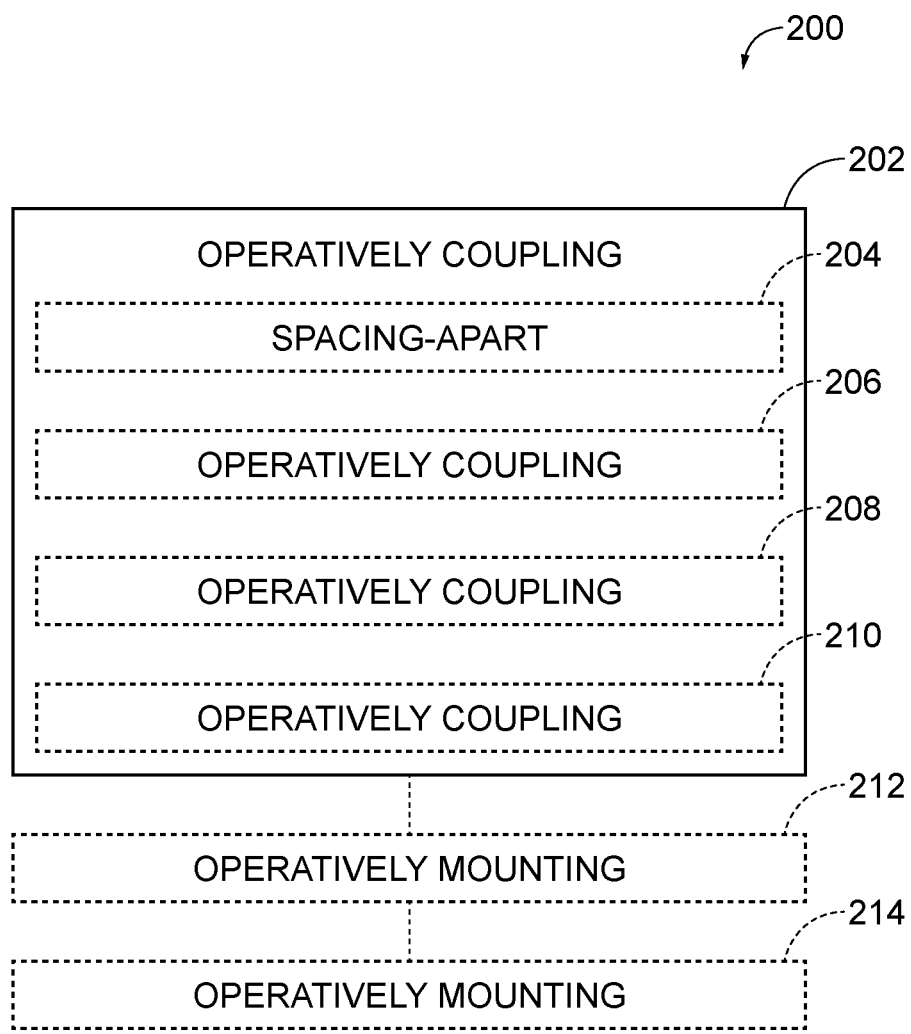
FIG. 26 is a schematic diagram representing example methods according to the present disclosure.

FIG. 26 schematically provides a flowchart that represents illustrative, non-exclusive examples of methods 200 according to the present disclosure. In FIG. 26, some steps are illustrated in dashed boxes indicating that such steps may be optional or may correspond to an optional version of a method 200 according to the present disclosure. That said, not all methods 200 according to the present disclosure are required to include the steps illustrated in solid boxes. The methods 200 and steps illustrated in FIG. 26 are not limiting and other methods and steps are within the scope of the present disclosure, including methods 200 having greater than or fewer than the number of steps illustrated, as understood from the discussions herein.

As schematically represented in FIG. 26, methods 200 of assembling a rotorcraft 10 comprise operatively coupling (at 202) at least four rotor assemblies 14 to a fuselage 12.

In some methods 200, the operatively coupling (at 202) comprises spacing-apart (at 204) spin volumes 24 of a first pair 20 of rotor assemblies 14 to be at least 70%, at least 80%, at least 90%, at least 100%, or at least 110% of a door-width 22 of an access door 18 of the rotorcraft 10.

In some methods 200, the operatively coupling (at 202) comprises operatively coupling (at 206) a first pair 20 of rotor assemblies 14 to a first pair 30 of elongate support arms 32 that extend from opposing lateral sides of the fuselage 12. In some such methods 200, the operatively coupling (at 202) comprises operatively coupling (at 208) a second pair 34 of rotor assemblies 14 to a second pair 36 of elongate support arms 32 that extend from opposing lateral sides of the fuselage 12.

In some methods 200, the operatively coupling (at 202) comprises operatively coupling (at 210) at least one rotor assembly 14 to each of a pair of aerodynamic structures 40 that extend from opposing lateral sides of the fuselage 12.

Some methods 200 further comprise operatively mounting (at 212) at least one rotor guard 50 that borders the spin volume 24 of at least one rotor assembly 14 of the rotorcraft 10. When so mounted, the rotor guard 50 provides a visual indication of the spin volume 24 of the associated rotor assembly 14.

Some methods further comprise operatively mounting (at 214) a skid gear 60 or other ground-contacting structure to the fuselage 12.

Illustrative, non-exclusive examples of inventive subject matter according to the present disclosure are described in the following enumerated paragraphs:

A. A multi-rotor rotorcraft (10), comprising:
a fuselage (12); and
at least four rotor assemblies (14) operatively supported by and spaced-around the fuselage (12), wherein each of the at least four rotor assemblies (14) defines a spin volume (24) and a spin diameter (26).

A1. The multi-rotor rotorcraft (10) of paragraph A,
wherein the fuselage (12) comprises an internal compartment (16) and an access door (18) having a door-width (22) that provides selective access to the internal compartment (16);
wherein the at least four rotor assemblies (14) comprise a first pair (20) of rotor assemblies (14) positioned on opposing sides of the access door (18); and wherein a spacing (28) between the spin volumes (24) of the first pair (20) of rotor assemblies (14) is at least 70%, at least 80%, at least 90%, at least 100%, at least 110%, or at least 120% of the door-width (22).

A1.1. The multi-rotor rotorcraft (10) of paragraph A1, wherein the internal compartment (16) is sized to selectively receive cargo, and wherein the access door (18) is sized to permit loading and unloading of cargo into and from the internal compartment (16).

A1.2. The multi-rotor rotorcraft (10) of paragraph A1, wherein the internal compartment (16) is configured for transportation of at least one human passenger, and wherein the access door (18) is sized for entry and exit of the at least one human passenger to and from the internal compartment (16).

A1.3. The multi-rotor rotorcraft (10) of any of paragraphs A1-A-1.2, wherein the internal compartment (16) has a volume of at least 0.5 cubic meters ($m^3$), of at least 1 $m^3$, of at least 1.5 $m^3$, of at least 2 $m^3$, of between 0.5 $m^3$ and 3 $m^3$, and/or at most 3 $m^3$, optionally for transporting cargo.

A2. The multi-rotor rotorcraft (10) of any of paragraphs A-A1.3,
wherein the at least four rotor assemblies (14) comprise a/the first pair (20) of rotor assemblies positioned on opposing lateral sides of the fuselage (12); and
wherein the multi-rotor rotorcraft (10) further comprises a first pair (30) of elongate support arms (32), each interconnecting a respective one of the first pair (20) of rotor assemblies (14) to the fuselage (12).

A2.1. The multi-rotor rotorcraft (10) of paragraph A2, wherein each elongate support arm (32) of the first pair (30) of elongate support arms (32) extends along a respective curved path between the fuselage (12) and the respective one of the first pair (20) of rotor assemblies (14).

A2.1.1. The multi-rotor rotorcraft (10) of paragraph A2.1, wherein, when viewed from above, each respective curved path is concave away from the fuselage (12).

A2.2. The multi-rotor rotorcraft (10) of any of paragraphs A2-A2.1.1,
wherein the at least four rotor assemblies (14) further comprise a second pair (34) of rotor assemblies (14) positioned on the opposing lateral sides of the fuselage (12); and
wherein the multi-rotor rotorcraft (10) further comprises a second pair (36) of elongate support arms (32), each interconnecting a respective one of the second pair (34) of rotor assemblies (14) to the fuselage (12).

A2.2.1. The multi-rotor rotorcraft (10) of paragraph A2.2, wherein each elongate support arm (32) of the second pair (36) of elongate support arms (32) extends along a respective curved path between the fuselage (12) and the respective one of the second pair (34) of rotor assemblies (14).

A2.2.1.1. The multi-rotor rotorcraft (10) of paragraph A2.2.1, wherein, when viewed from above, each respective curved path is concave away from the fuselage (12).

A3. The multi-rotor rotorcraft (10) of any of paragraphs A-A2.2.1.1, further comprising a pair of aerodynamic structures (40) extending from opposing lateral sides of the fuselage (12), wherein at least one rotor assembly (14) of the at least four rotor assemblies (14) is supported by each of the pair of aerodynamic structures (40).

A3.1. The multi-rotor rotorcraft (10) of paragraph A3,
wherein the at least four rotor assemblies (14) comprise:
a/the first pair (20) of rotor assemblies (14) positioned on opposing lateral sides of the fuselage (12);
a/the second pair (34) of rotor assemblies (14) positioned on the opposing lateral sides of the fuselage (12); and
a third pair (38) of rotor assemblies (14) positioned on the opposing lateral sides of the fuselage (12); and
wherein each of the third pair (38) of rotor assemblies (14) is supported by one of the pair of aerodynamic structures (40).

A3.1.1. The multi-rotor rotorcraft (10) of paragraph A3.1, wherein the third pair (38) of rotor assemblies (14) is positioned between the first pair (20) of rotor assemblies (14) and the second pair (34) of rotor assemblies (14).

A3.2. The multi-rotor rotorcraft (10) of any of paragraphs A3-A3.1.1, wherein the pair of aerodynamic structures (40) is a pair of wings.

A4. The multi-rotor rotorcraft (10) of any of paragraphs A-A3.2, wherein each rotor assembly (14) of the at least four rotor assemblies (14) comprises a pair of co-axial rotors (42).

A4.1. The multi-rotor rotorcraft (10) of paragraph A4, wherein the pair of co-axial rotors (42) of a first set of the at least four rotor assemblies (14) are configured to counter-rotate, and wherein the pair of co-axial rotors (42) of a second set of the at least four rotor assemblies (14) are configured to co-rotate.

A5. The multi-rotor rotorcraft (10) of any of paragraphs A-A4.1, further comprising at least one rotor guard (50) that is fixed relative to the fuselage (12), that borders the spin volume (24) of at least one of the at least four rotor assemblies (14), and that is configured to provide a visual indication of the spin volume (24) of the at least one of the at least four rotor assemblies (14).

A5.1. The multi-rotor rotorcraft (10) of paragraph A5, wherein the at least one rotor guard (50) is substantially parallel to a plane that is perpendicular to a spin axis of the at least one of the at least four rotor assemblies (14).

A5.2. The multi-rotor rotorcraft (10) of any of paragraphs A5-A5.1, wherein the at least one rotor guard (50) comprises at least one circular rotor guard (52) that substantially encircles the spin volume (24) of one of the at least four rotor assemblies (14), and optionally at least four circular rotor guards (52) that respectively substantially encircle each spin volume (24) of the at least four rotor assemblies (14).

A5.2.1. The multi-rotor rotorcraft (10) of paragraph A5.1 when depending from paragraph A4, wherein the at least one circular rotor guard (52) comprises two circular rotor guards (52) that substantially encircle the spin volume (24) of one of the pair of co-axial rotors (42), and optionally at least eight circular rotor guards (52), pairs of which respectively substantially encircle each spin volume (24) of the at least four rotor assemblies (14).

A5.3 The multi-rotor rotorcraft (10) of any of paragraphs A5-A5.2.1, wherein the at least one rotor guard (50) comprises at least one arced rotor guard (54) that partially borders the spin volume (24) of one of the at least four rotor assemblies (14), and optionally at least four arced rotor guards (54) that respectively partially border each spin volume (24) of the at least four rotor assemblies (14).

A5.3.1. The multi-rotor rotorcraft (10) of paragraph A5.3 when depending from paragraph A4, wherein the at least one arced rotor guard (54) comprises two arced rotor guards (54) that partially border the spin volume (24) of one of the pair of co-axial rotors (42), and optionally at least eight arced rotor guards (54), pairs of which respectively partially boarder each spin volume (24) of the at least four rotor assemblies (14).

A5.4. The multi-rotor rotorcraft (10) of any of paragraphs A5-A5.3.1, wherein the at least one rotor guard (50) comprises at least one combined rotor guard (56) that at least partially borders the spin volume (24) of more than one of the at least four rotor assemblies (14).

A5.4.1. The multi-rotor rotorcraft (10) of paragraph A5.4, wherein the at least four rotor assemblies (14) comprises six rotor assemblies (14); and wherein the at least one combined rotor guard (56) comprises two combined rotor guards (56), each bordering the spin volume (24) of three of the six rotor assemblies (14).

A5.4.1.1. The multi-rotor rotorcraft (10) of paragraph A5.4.1, wherein the six rotor assemblies (14) comprise:
a/the first pair (20) of rotor assemblies (14) positioned on opposing lateral sides of the fuselage (12);
a/the second pair (34) of rotor assemblies (14) positioned on the opposing lateral sides of the fuselage (12); and
a/the third pair (38) of rotor assemblies (14) positioned on the opposing lateral sides of the fuselage (12) between the first pair (20) and the second pair (34); and wherein each of the two combined rotor guards (56) border more than 50% of circumferential perimeters of the spin volumes (24) of respective rotor assemblies (14) of the first pair (20) and the second pair (34) and less than 50% of a circumferential perimeter of the spin volume (24) of the third pair (38).

A5.4.2. The multi-rotor rotorcraft (10) of any of paragraphs A5.4-A5.4.1.1, wherein each of the at least one combined rotor guard (56) borders at least 50%, at least 40%, at least 30%, at least 20%, at most 75%, at most 65%, at most 55%, and/or at most 45% of a circumferential perimeter of the spin volume (24) of an adjacent corresponding rotor assembly (14).

A5.4.3. The multi-rotor rotorcraft (10) of any of paragraphs A5.4-A5.4.2, wherein a combined rotor guard (56) of the at least one combined rotor guard (56) borders a greater portion of a circumferential perimeter of an adjacent spin volume (24) than of a circumferential perimeter of another adjacent spin volume (24).

A5.4.4. The multi-rotor rotorcraft (10) of any of paragraphs A5.4-A5.4.3, wherein a combined rotor guard (56) of the at least one combined rotor guard (56) borders more than 50% of a circumferential perimeter of one adjacent spin volume (24) and borders less than 50% of a circumferential perimeter of another adjacent spin volume (24).

A5.4.5. The multi-rotor rotorcraft (10) of any of paragraphs A5.4-A5.4.4, wherein the at least one combined rotor guard (56) comprises at least one segment (58) that is non-parallel to a plane that is perpendicular to a spin axis of an adjacent one of the at least four rotor assemblies (14).

A6. The multi-rotor rotorcraft (10) of any of paragraphs A-A5.4.5, further comprising a skid gear (60) coupled to the fuselage (12) and configured to support the multi-rotor rotorcraft (10) in an upright orientation on a ground surface.

A7. The multi-rotor rotorcraft (10) of any of paragraphs A-A6, further comprising any one or more of the elements, features, aspects, configurations, dimensions, characteristics, and/or properties disclosed and/or incorporated herein.

B. The use of the multi-rotor rotorcraft (10) of any of paragraphs A-A7 to transport a payload.

C. A method (200) of assembling a multi-rotor rotorcraft (10), the method comprising:
operatively coupling (202) at least four rotor assemblies (14) to a fuselage (12).

C1. The method (200) of paragraph C,
wherein each of the at least four rotor assemblies (14) defines a spin volume (24) and a spin diameter (26);

wherein the fuselage (12) comprises an internal compartment (16) and an access door (18) having a door-width (22) that provides selective access to the internal compartment (16);

wherein the at least four rotor assemblies (14) comprise a first pair (20) of rotor assemblies (14) positioned on opposing sides of the access door (18); and wherein the operatively coupling (202) comprises spacing-apart (204) the spin volumes (24) of the first pair (20) of rotor assemblies (14) to be at least 70%, at least 80%, at least 90%, at least 100%, or at least 110% of the door-width (22).

C2. The method (200) of any of paragraphs C-C1, wherein the operatively coupling (202) comprises operatively coupling (206) a/the first pair (20) of rotor assemblies to a first pair (30) of elongate support arms (32) extending from opposing lateral sides of the fuselage (12).

C2.1. The method (200) of paragraph C2, wherein the operatively coupling (202) comprises operatively coupling (208) a second pair (34) of rotor assemblies (14) to a second pair (36) of elongate support arms (32) extending from opposing lateral sides of the fuselage (12).

C3. The method (200) of any of paragraphs C-C2.1, wherein the operatively coupling (202) comprises operatively coupling (210) at least one rotor assembly (14) to each of a pair of aerodynamic structures (40) extending from opposing lateral sides of the fuselage (12).

C4. The method (200) of any of paragraphs C-C3, further comprising:
operatively mounting (212) at least one rotor guard (50) that borders a spin volume (24) of at least one of the at least four rotor assemblies (14), wherein the at least one rotor guard (50) is configured to provide a visual indication of the spin volume (24) of the at least one of the at least four rotor assemblies (14).

C5. The method (200) of any of paragraphs C-C4, further comprising:
operatively mounting (214) a skid gear (60) to the fuselage (12), wherein the skid gear (60) is configured to support the multi-rotor rotorcraft (10) in an upright orientation on a ground surface.

C6. The method (200) of any of paragraphs C-C5, further comprising the subject matter of any of paragraphs A-A7.

C7. The method (200) of any of paragraphs C-C6, further comprising any one or more of the elements, features, aspects, configurations, dimensions, characteristics, and/or properties disclosed and/or incorporated herein.

D. A method (200) of assembling a multi-rotor rotorcraft (10), the method comprising:
operatively coupling (202) at least four rotor assemblies (14) to a fuselage (12); and
operatively mounting (212) at least one combined rotor guard (56) that at least partially borders spin volumes (24) of more than one of the at least four rotor assemblies (14), wherein the at least one combined rotor guard (56) is configured to provide a visual indication of the spin volumes (24).

D1. The method (200) of paragraph D, further comprising the subject matter of any of paragraphs C-C7.

E. A multi-rotor rotorcraft (10), comprising:
a fuselage (12), wherein the fuselage (12) comprises an internal compartment (16) and an access door (18) having a door-width (22) that provides selective access to the internal compartment (16);
six rotor assemblies (14) operatively supported by and spaced-around the fuselage (12), wherein each of the six rotor assemblies (14) defines a spin volume (24) and a spin diameter (26), wherein each of the six rotor assemblies (14)

comprises a pair of co-axial rotors (42), and wherein the six rotor assemblies (14) comprise:

a first pair (20) of rotor assemblies (14) positioned on opposing lateral sides of the fuselage (12);

a second pair (34) of rotor assemblies (14) positioned on the opposing lateral sides of the fuselage (12); and a third pair (38) of rotor assemblies (14) positioned on the opposing lateral sides of the fuselage (12) between the first pair (20) of rotor assemblies (14) and the second pair (34) of rotor assemblies (14);

a first pair (30) of elongate support arms (32), each interconnecting a respective one of the first pair (20) of rotor assemblies (14) to the fuselage (12), wherein each elongate support arm (32) of the first pair (30) of elongate support arms (32) extends along a respective curved path between the fuselage (12) and the respective one of the first pair (20) of rotor assemblies (14);

a second pair (36) of elongate support arms (32), each interconnecting a respective one of the second pair (34) of rotor assemblies (14) to the fuselage (12), wherein each elongate support arm (32) of the second pair (36) of elongate support arms (32) extends along a respective curved path between the fuselage (12) and the respective one of the second pair (34) of rotor assemblies (14);

a pair of aerodynamic structures (40) extending from opposing lateral sides of the fuselage (12), each supporting a respective one of the third pair (38) of rotor assemblies (14); and six circular rotor guards (52), each encircling the spin volume (24) of one of the co-axial rotors (42) of the six rotor assemblies (14).

E1. The multi-rotor rotorcraft (10) of paragraph E, further comprising the subject matter of any of paragraphs A-A7.

F. A method of enhancing operation of a multi-rotor vehicle (10), the method comprising:

utilizing at least two combined rotor guards (56), wherein each combined rotor guard (56) borders spin volumes (24) of more than one rotor assembly (14).

F1. The method of paragraph F, wherein the at least two combined rotor guards (56) collectively border at least 50% of circumferential perimeters of spin volumes (24) of all rotor assemblies (14) of the multi-rotor vehicle (10).

F2. The method of any of paragraphs F-F1, wherein the multi-rotor vehicle (10) comprises a fuselage (12), wherein the rotor assemblies (14) are operatively supported by the fuselage (12), wherein the fuselage (12) comprises an internal compartment (16) and an access door (18) that provides selective access to the internal compartment (16), and wherein the internal compartment (16) has a volume of at least 0.5 cubic meters for transporting cargo.

F3. The method of any of paragraphs F-F2, further comprising the subject matter of any of paragraphs A-E1.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A multi-rotor rotorcraft, comprising:

a fuselage;

at least four rotor assemblies operatively supported by and spaced-around the fuselage, wherein each of the at least four rotor assemblies defines a spin volume and a spin diameter; and at least one rotor guard that is fixed relative to the fuselage, that borders the spin volume of at least one of the at least four rotor assemblies, and that is configured to provide a visual indication of the spin volume of the at least one of the at least four rotor assemblies, wherein the at least one rotor guard comprises at least one combined rotor guard that at least partially borders the spin volume of more than one of the at least four rotor assemblies;

wherein the fuselage comprises an internal compartment and an access door having a door-width that provides selective access to the internal compartment;

wherein the at least four rotor assemblies comprise a first pair of rotor assemblies positioned on opposing sides of the access door; and wherein a spacing between the spin volumes of the first pair of rotor assemblies is at least 100% of the door-width.

2. The multi-rotor rotorcraft of claim 1, wherein the at least four rotor assemblies comprises six rotor assemblies; and wherein the at least one combined rotor guard comprises two combined rotor guards, each bordering the spin volume of three of the six rotor assemblies.

3. The multi-rotor rotorcraft of claim 2, wherein the six rotor assemblies comprise:

the first pair of rotor assemblies;
a second pair of rotor assemblies positioned on opposing lateral sides of the fuselage; and
a third pair of rotor assemblies positioned on the opposing lateral sides of the fuselage between the first pair and the second pair; and
wherein each of the two combined rotor guards borders more than 50% of circumferential perimeters of the spin volumes of respective rotor assemblies of the first pair and the second pair and less than 50% of a circumferential perimeter of the spin volume of the third pair.

4. The multi-rotor rotorcraft of claim 1, wherein each of the at least one combined rotor guard borders at least 50% of a circumferential perimeter of the spin volume of an adjacent corresponding rotor assembly.

5. The multi-rotor rotorcraft of claim 1, wherein a combined rotor guard of the at least one combined rotor guard borders a greater portion of a circumferential perimeter of an adjacent spin volume than of a circumferential perimeter of another adjacent spin volume.

6. The multi-rotor rotorcraft of claim 1, wherein a combined rotor guard of the at least one combined rotor guard borders more than 50% of a circumferential perimeter of one adjacent spin volume and borders less than 50% of a circumferential perimeter of another adjacent spin volume.

7. The multi-rotor rotorcraft of claim 1, wherein the at least one combined rotor guard comprises at least one segment that is non-parallel to a plane that is perpendicular to a spin axis of an adjacent one of the at least four rotor assemblies.

8. A multi-rotor rotorcraft, comprising:
a fuselage; and
at least four rotor assemblies operatively supported by and spaced-around the fuselage, wherein each of the at least four rotor assemblies defines a spin volume and a spin diameter;
wherein the fuselage comprises an internal compartment and an access door having a door- width that provides selective access to the internal compartment;
wherein the at least four rotor assemblies comprise a first pair of rotor assemblies positioned on opposing sides of the access door;
wherein a spacing between the spin volumes of the first pair of rotor assemblies is at least 100% of the door-width;
wherein the multi-rotor rotorcraft further comprises a first pair of elongate support arms, each interconnecting a respective one of the first pair of rotor assemblies to the fuselage;
wherein each elongate support arm of the first pair of elongate support arms extends along a respective curved path between the fuselage and the respective one of the first pair of rotor assemblies; and
wherein, when viewed from above, each respective curved path is concave away from the fuselage.

9. The multi-rotor rotorcraft of claim 8, wherein the internal compartment is configured for transportation of at least one human passenger, and wherein the access door is sized for entry and exit of the at least one human passenger to and from the internal compartment.

10. The multi-rotor rotorcraft of claim 8,
wherein the at least four rotor assemblies further comprise a second pair of rotor assemblies positioned on opposing lateral sides of the fuselage;
wherein the multi-rotor rotorcraft further comprises a second pair of elongate support arms, each interconnecting a respective one of the second pair of rotor assemblies to the fuselage; and
wherein each elongate support arm of the second pair of elongate support arms extends along a respective curved path between the fuselage and the respective one of the second pair of rotor assemblies.

11. The multi-rotor rotorcraft of claim 10, wherein, when viewed from above, each respective curved path is concave away from the fuselage.

12. The multi-rotor rotorcraft of claim 8, further comprising a pair of aerodynamic structures extending from opposing lateral sides of the fuselage, wherein at least one rotor assembly of the at least four rotor assemblies is supported by each of the pair of aerodynamic structures.

13. The multi-rotor rotorcraft of claim 12,
wherein the at least four rotor assemblies further comprise:
a second pair of rotor assemblies positioned on the opposing lateral sides of the fuselage; and
a third pair of rotor assemblies positioned on the opposing lateral sides of the fuselage; and
wherein each of the third pair of rotor assemblies is supported by one of the pair of aerodynamic structures.

14. The multi-rotor rotorcraft of claim 13, wherein the third pair of rotor assemblies is positioned between the first pair of rotor assemblies and the second pair of rotor assemblies.

15. The multi-rotor rotorcraft of claim 8, wherein each rotor assembly of the at least four rotor assemblies comprises a pair of co-axial rotors.

16. A method of assembling the multi-rotor rotorcraft of claim 1, the method comprising:
operatively coupling the at least four rotor assemblies to the fuselage; and
operatively mounting the at least one combined rotor guard that at least partially borders the spin volumes of more than one of the at least four rotor assemblies and that is fixed relative to the fuselage, wherein the at least one combined rotor guard is configured to provide visual indication of the spin volumes.

17. A method of enhancing operation of a multi-rotor vehicle, the method comprising:
utilizing at least two combined rotor guards, wherein each combined rotor guard borders spin volumes of more than one rotor assembly, wherein each combined rotor guard is fixed relative to a fuselage of the multi-rotor vehicle, and wherein the at least two combined rotor guards collectively border at least 50% of circumferential perimeters of spin volumes of all rotor assemblies of the multi-rotor vehicle;
wherein the fuselage comprises an internal compartment and an access door having a door-width that provides selective access to the internal compartment;
wherein the rotor assemblies comprise a first pair of rotor assemblies positioned on opposing sides of the access door; and
wherein a spacing between the spin volumes of the first pair of rotor assemblies is at least 100% of the door-width.

18. The method of claim 17 wherein the rotor assemblies are operatively supported by the fuselage, and wherein the internal compartment has a volume of at least 0.5 cubic meters for transporting cargo.

19. The multi-rotor rotorcraft of claim 8, wherein the internal compartment is sized to selectively receive cargo, and wherein the access door is sized to permit loading and unloading of cargo into and from the internal compartment.

20. A multi-rotor rotorcraft, comprising:
a fuselage; and
at least four rotor assemblies operatively supported by and spaced-around the fuselage, wherein each of the at least four rotor assemblies defines a spin volume and a spin diameter;
wherein the fuselage comprises an internal compartment and an access door having a door-width that provides selective access to the internal compartment;
wherein the at least four rotor assemblies comprise a first pair of rotor assemblies positioned on opposing sides of the access door;
wherein the at least four rotor assemblies further comprise a second pair of rotor assemblies positioned on opposing lateral sides of the fuselage;
wherein the multi-rotor rotorcraft further comprises a second pair of elongate support arms, each interconnecting a respective one of the second pair of rotor assemblies to the fuselage;
wherein each elongate support arm of the second pair of elongate support arms extends along a respective curved path between the fuselage and the respective one of the second pair of rotor assemblies;
wherein the multi-rotor rotorcraft further comprises a first pair of elongate support arms, each interconnecting a respective one of the first pair of rotor assemblies to the fuselage; and
wherein each elongate support arm of the first pair of elongate support arms extends along a respective curved path between the fuselage and the respective one of the first pair of rotor assemblies.

21. A multi-rotor rotorcraft, comprising:
a fuselage;
at least four rotor assemblies operatively supported by and spaced-around the fuselage, wherein each of the at least four rotor assemblies defines a spin volume and a spin diameter; and
a pair of aerodynamic structures extending from opposing lateral sides of the fuselage, wherein at least one rotor assembly of the at least four rotor assemblies is supported by each of the pair of aerodynamic structures;
wherein the fuselage comprises an internal compartment and an access door having a door-width that provides selective access to the internal compartment;
wherein the at least four rotor assemblies comprise a first pair of rotor assemblies positioned on opposing sides of the access door;
wherein the at least four rotor assemblies further comprise:
a second pair of rotor assemblies positioned on the opposing lateral sides of the fuselage; and
a third pair of rotor assemblies positioned on the opposing lateral sides of the fuselage; and
wherein each of the third pair of rotor assemblies is supported by one of the pair of aerodynamic structures.

* * * * *